(12) United States Patent
Forstall et al.

(10) Patent No.: US 9,702,709 B2
(45) Date of Patent: *Jul. 11, 2017

(54) DISFAVORED ROUTE PROGRESSIONS OR LOCATIONS

(71) Applicant: Apple Inc., Cupertino, CA (US)

(72) Inventors: Scott Forstall, Mountain View, CA (US); Gregory N. Christie, San Jose, CA (US); Robert E. Borchers, Pleasanton, CA (US); Kevin Tiene, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 13/773,866

(22) Filed: Feb. 22, 2013

(65) Prior Publication Data

US 2013/0166208 A1    Jun. 27, 2013

Related U.S. Application Data

(63) Continuation of application No. 12/020,168, filed on Jan. 25, 2008, now Pat. No. 8,385,946.

(Continued)

(51) Int. Cl.
*G01C 21/00* (2006.01)
*G01C 21/26* (2006.01)
(Continued)

(52) U.S. Cl.
CPC ......... *G01C 21/26* (2013.01); *G01C 21/3453* (2013.01); *G01C 21/3484* (2013.01);
(Continued)

(58) Field of Classification Search
CPC .... G01C 21/34; G01C 21/26; G01C 21/3691; G01C 21/20; G01C 21/3461;
(Continued)

(56) References Cited

U.S. PATENT DOCUMENTS 4,644,351 A    2/1987 Zabarsky et al.
4,903,212 A    2/1990 Yokouchi et al.
(Continued)

FOREIGN PATENT DOCUMENTS

BR    9904979    12/2000
CA    2163215    11/1994
(Continued)

OTHER PUBLICATIONS

"3rd Generation Partnership Project (3GPP); Technical Specification Group (TSG) RAN; Working Group 2 (WG2); Report on Location Services (LCS)," 3G TR 25.923 v.1.0.0, Apr. 1999, 45 pages.

(Continued)

*Primary Examiner* — Olumide T Ajibade Akonai
(74) *Attorney, Agent, or Firm* — Fish & Richardson P.C.

(57) ABSTRACT

Adaptive route guidance can include analyzing route progressions associated with one or more routes based on multiple user preferences. The adaptive route guidance can provide one or more preferred routes based on the user preferences, which can be presented to a user for navigation purposes.

30 Claims, 7 Drawing Sheets

Related U.S. Application Data

(60) Provisional application No. 60/946,837, filed on Jun. 28, 2007.

(51) Int. Cl.
*G01C 21/34* (2006.01)
*G01C 21/36* (2006.01)

(52) U.S. Cl.
CPC ......... *G01C 21/3617* (2013.01); *G01C 21/34* (2013.01); *G01C 21/362* (2013.01)

(58) Field of Classification Search
CPC ........... G01C 21/3617; G01C 21/3679; G01C 21/3484; G01C 21/3641; H04W 4/046
USPC ................ 455/404.2, 456.1–456.6; 701/400
See application file for complete search history.

(56) References Cited

U.S. PATENT DOCUMENTS

| | | | |
|---|---|---|---|
| 4,907,159 A | 3/1990 | Mauge et al. |
| 4,999,783 A | 3/1991 | Tenmoku et al. |
| 5,031,104 A | 7/1991 | Ikeda et al. |
| 5,046,011 A | 9/1991 | Kakihara et al. |
| 5,067,081 A | 11/1991 | Person |
| 5,126,941 A | 6/1992 | Gurmu et al. |
| 5,164,904 A | 11/1992 | Sumner |
| 5,170,165 A | 12/1992 | Iihoshi et al. |
| 5,173,691 A | 12/1992 | Sumner |
| 5,182,555 A | 1/1993 | Sumner |
| 5,187,810 A | 2/1993 | Yoneyama et al. |
| 5,195,031 A | 3/1993 | Ordish |
| 5,208,763 A | 5/1993 | Hong et al. |
| 5,218,629 A | 6/1993 | Dumond, Jr. et al. |
| 5,243,652 A | 9/1993 | Teare et al. |
| 5,274,560 A | 12/1993 | LaRue |
| 5,289,572 A | 2/1994 | Yano et al. |
| 5,295,064 A | 3/1994 | Malec et al. |
| 5,307,278 A | 4/1994 | Hermans et al. |
| 5,317,311 A | 5/1994 | Martell et al. |
| 5,337,044 A | 8/1994 | Folger et al. |
| 5,339,391 A | 8/1994 | Wroblewski et al. |
| 5,371,678 A | 12/1994 | Nomura |
| 5,374,933 A | 12/1994 | Kao |
| 5,379,057 A | 1/1995 | Clough et al. |
| 5,390,125 A | 2/1995 | Sennott et al. |
| 5,406,490 A | 4/1995 | Braegas |
| 5,416,712 A | 5/1995 | Geier et al. |
| 5,416,890 A | 5/1995 | Beretta |
| 5,440,484 A | 8/1995 | Kao |
| 5,463,725 A | 10/1995 | Henckel |
| 5,469,362 A | 11/1995 | Hunt et al. |
| 5,479,600 A | 12/1995 | Wroblewski et al. |
| 5,504,482 A | 4/1996 | Schreder |
| 5,508,707 A | 4/1996 | LeBlanc et al. |
| 5,510,801 A | 4/1996 | Engelbrecht et al. |
| 5,519,760 A | 5/1996 | Borkowski et al. |
| 5,523,950 A | 6/1996 | Peterson |
| 5,537,460 A | 7/1996 | Holliday, Jr. et al. |
| 5,539,395 A | 7/1996 | Buss et al. |
| 5,539,647 A | 7/1996 | Shibata et al. |
| 5,552,989 A | 9/1996 | Bertrand |
| 5,559,520 A | 9/1996 | Barzegar et al. |
| 5,570,412 A | 10/1996 | LeBlanc |
| 5,598,572 A | 1/1997 | Tanikoshi et al. |
| 5,627,547 A | 5/1997 | Ramaswamy et al. |
| 5,627,549 A | 5/1997 | Park |
| 5,628,050 A | 5/1997 | McGraw et al. |
| 5,630,206 A | 5/1997 | Urban et al. |
| 5,636,245 A | 6/1997 | Ernst et al. |
| 5,642,303 A | 6/1997 | Small et al. |
| 5,646,853 A | 7/1997 | Takahashi et al. |
| 5,654,908 A | 8/1997 | Yokoyama |
| 5,663,732 A | 9/1997 | Stangeland et al. |
| 5,675,362 A | 10/1997 | Clough et al. |
| 5,675,573 A | 10/1997 | Karol et al. |
| 5,677,837 A | 10/1997 | Reynolds |
| 5,684,859 A | 11/1997 | Chanroo et al. |
| 5,689,252 A | 11/1997 | Ayanoglu et al. |
| 5,689,269 A | 11/1997 | Norris |
| 5,689,270 A | 11/1997 | Kelley et al. |
| 5,689,431 A | 11/1997 | Rudow et al. |
| 5,708,478 A | 1/1998 | Tognazzini |
| 5,717,392 A | 2/1998 | Eldridge |
| 5,727,057 A | 3/1998 | Emery et al. |
| 5,732,074 A | 3/1998 | Spaur et al. |
| 5,742,666 A | 4/1998 | Alpert |
| 5,745,865 A | 4/1998 | Rostoker et al. |
| 5,748,109 A | 5/1998 | Kosaka et al. |
| 5,748,148 A | 5/1998 | Heiser et al. |
| 5,748,149 A | 5/1998 | Kawahata |
| 5,752,186 A | 5/1998 | Malackowski et al. |
| 5,754,430 A | 5/1998 | Sawada |
| 5,758,049 A | 5/1998 | Johnson et al. |
| 5,760,773 A | 6/1998 | Berman et al. |
| 5,767,795 A | 6/1998 | Schaphorst |
| 5,771,280 A | 6/1998 | Johnson |
| 5,774,824 A | 6/1998 | Streit et al. |
| 5,774,829 A | 6/1998 | Cisneros et al. |
| 5,793,630 A | 8/1998 | Theimer et al. |
| 5,796,365 A | 8/1998 | Lewis et al. |
| 5,796,613 A | 8/1998 | Kato et al. |
| 5,799,061 A | 8/1998 | Melcher et al. |
| 5,806,018 A | 9/1998 | Smith et al. |
| 5,825,306 A | 10/1998 | Hiyokawa et al. |
| 5,825,884 A | 10/1998 | Zdepski et al. |
| 5,831,552 A | 11/1998 | Sogawa et al. |
| 5,835,061 A | 11/1998 | Stewart |
| 5,839,086 A | 11/1998 | Hirano |
| 5,845,227 A | 12/1998 | Peterson |
| 5,848,373 A | 12/1998 | DeLorme et al. |
| 5,862,244 A | 1/1999 | Kleiner et al. |
| 5,867,110 A | 2/1999 | Naito et al. |
| 5,870,686 A | 2/1999 | Monson |
| 5,872,526 A | 2/1999 | Tognazzini |
| 5,873,068 A | 2/1999 | Beaumont et al. |
| 5,883,580 A | 3/1999 | Briancon et al. |
| 5,887,269 A | 3/1999 | Brunts et al. |
| 5,892,454 A | 4/1999 | Schipper et al. |
| 5,893,898 A | 4/1999 | Tanimoto |
| 5,898,680 A | 4/1999 | Johnstone et al. |
| 5,899,954 A | 5/1999 | Sato |
| 5,905,451 A | 5/1999 | Sakashita |
| 5,908,465 A | 6/1999 | Ito et al. |
| 5,910,799 A | 6/1999 | Carpenter et al. |
| 5,923,861 A | 7/1999 | Bertram et al. |
| 5,933,094 A | 8/1999 | Goss et al. |
| 5,933,100 A | 8/1999 | Golding |
| 5,936,572 A | 8/1999 | Loomis et al. |
| 5,938,721 A | 8/1999 | Dussell et al. |
| 5,941,930 A | 8/1999 | Morimoto et al. |
| 5,941,934 A | 8/1999 | Sato |
| 5,946,618 A | 8/1999 | Agre et al. |
| 5,948,040 A | 9/1999 | DeLorme et al. |
| 5,948,041 A | 9/1999 | Abo et al. |
| 5,948,061 A | 9/1999 | Merriman et al. |
| 5,955,973 A | 9/1999 | Anderson |
| 5,959,577 A | 9/1999 | Fan et al. |
| 5,959,580 A | 9/1999 | Maloney et al. |
| 5,968,109 A | 10/1999 | Israni et al. |
| 5,969,678 A | 10/1999 | Stewart |
| 5,982,298 A | 11/1999 | Lappenbusch et al. |
| 5,982,324 A | 11/1999 | Watters et al. |
| 5,987,381 A | 11/1999 | Oshizawa |
| 5,991,692 A | 11/1999 | Spencer, II et al. |
| 5,999,126 A | 12/1999 | Ito |
| 6,002,932 A | 12/1999 | Kingdon et al. |
| 6,002,936 A | 12/1999 | Roel-Ng et al. |
| 6,005,928 A | 12/1999 | Johnson |
| 6,014,090 A | 1/2000 | Rosen et al. |
| 6,014,607 A | 1/2000 | Yagyu et al. |
| 6,018,697 A | 1/2000 | Morimoto et al. |
| 6,023,653 A | 2/2000 | Ichimura et al. |
| 6,026,375 A | 2/2000 | Hall et al. |

(56) References Cited

U.S. PATENT DOCUMENTS

| | | |
|---|---|---|
| 6,028,550 A | 2/2000 | Froeberg et al. |
| 6,029,069 A | 2/2000 | Takaki |
| 6,031,490 A | 2/2000 | Forssen et al. |
| 6,041,280 A | 3/2000 | Kohli et al. |
| 6,052,645 A | 4/2000 | Harada |
| 6,058,350 A | 5/2000 | Ihara |
| 6,064,335 A | 5/2000 | Eschenbach |
| 6,067,502 A | 5/2000 | Hayashida et al. |
| 6,069,570 A | 5/2000 | Herring |
| 6,073,013 A | 6/2000 | Agre et al. |
| 6,073,062 A | 6/2000 | Hoshino et al. |
| 6,076,041 A | 6/2000 | Watanabe |
| 6,078,818 A | 6/2000 | Kingdon et al. |
| 6,081,206 A | 6/2000 | Kielland |
| 6,085,090 A | 7/2000 | Yee et al. |
| 6,085,148 A | 7/2000 | Jamison et al. |
| 6,087,965 A | 7/2000 | Murphy |
| 6,088,594 A | 7/2000 | Kingdon et al. |
| 6,091,956 A | 7/2000 | Hollenberg |
| 6,091,957 A | 7/2000 | Larkins et al. |
| 6,092,076 A | 7/2000 | McDonough et al. |
| 6,094,607 A | 7/2000 | Diesel |
| 6,101,443 A | 8/2000 | Kato et al. |
| 6,104,931 A | 8/2000 | Havinis et al. |
| 6,108,555 A | 8/2000 | Maloney et al. |
| 6,111,541 A | 8/2000 | Karmel |
| 6,115,611 A | 9/2000 | Kimoto et al. |
| 6,115,754 A | 9/2000 | Landgren |
| 6,119,014 A | 9/2000 | Alperovich et al. |
| 6,122,520 A | 9/2000 | Want et al. |
| 6,125,279 A | 9/2000 | Hyziak et al. |
| 6,127,945 A | 10/2000 | Mura-Smith |
| 6,128,482 A | 10/2000 | Nixon et al. |
| 6,128,571 A | 10/2000 | Ito et al. |
| 6,134,548 A | 10/2000 | Gottsman et al. |
| 6,138,003 A | 10/2000 | Kingdon et al. |
| 6,138,142 A | 10/2000 | Linsk |
| 6,140,957 A | 10/2000 | Wilson et al. |
| 6,151,309 A | 11/2000 | Busuioc et al. |
| 6,151,498 A | 11/2000 | Roel-Ng et al. |
| 6,154,152 A | 11/2000 | Ito |
| 6,157,381 A | 12/2000 | Bates et al. |
| 6,157,841 A | 12/2000 | Bolduc et al. |
| 6,163,749 A | 12/2000 | McDonough et al. |
| 6,166,627 A | 12/2000 | Reeley |
| 6,167,266 A | 12/2000 | Havinis et al. |
| 6,169,552 B1 | 1/2001 | Endo et al. |
| 6,175,740 B1 | 1/2001 | Souissi et al. |
| 6,177,905 B1 | 1/2001 | Welch |
| 6,177,938 B1 | 1/2001 | Gould |
| 6,181,934 B1 | 1/2001 | Havinis et al. |
| 6,185,427 B1 | 2/2001 | Krasner et al. |
| 6,188,959 B1 | 2/2001 | Schupfner |
| 6,195,557 B1 | 2/2001 | Havinis et al. |
| 6,195,609 B1 | 2/2001 | Pilley et al. |
| 6,199,014 B1 | 3/2001 | Walker et al. |
| 6,199,045 B1 | 3/2001 | Giniger et al. |
| 6,199,099 B1 | 3/2001 | Gershman et al. |
| 6,202,008 B1 | 3/2001 | Beckert et al. |
| 6,202,023 B1 | 3/2001 | Hancock et al. |
| 6,208,866 B1 | 3/2001 | Rouhollahzadeh et al. |
| 6,212,473 B1 | 4/2001 | Stefan et al. |
| 6,216,086 B1 | 4/2001 | Seymour et al. |
| 6,222,483 B1 | 4/2001 | Twitchell et al. |
| 6,233,518 B1 | 5/2001 | Lee |
| 6,236,365 B1 | 5/2001 | LeBlanc et al. |
| 6,236,933 B1 | 5/2001 | Lang |
| 6,246,948 B1 | 6/2001 | Thakker |
| 6,249,252 B1 | 6/2001 | Dupray |
| 6,252,543 B1 | 6/2001 | Camp |
| 6,252,544 B1 | 6/2001 | Hoffberg |
| 6,256,498 B1 | 7/2001 | Ludwig |
| 6,259,405 B1 | 7/2001 | Stewart et al. |
| 6,266,612 B1 | 7/2001 | Dussell et al. |
| 6,266,614 B1 | 7/2001 | Alumbaugh |
| 6,266,615 B1 | 7/2001 | Jin |
| 6,272,342 B1 | 8/2001 | Havinis et al. |
| 6,278,884 B1 | 8/2001 | Kim |
| 6,281,807 B1 | 8/2001 | Kynast et al. |
| 6,282,491 B1 | 8/2001 | Bochmann et al. |
| 6,282,496 B1 | 8/2001 | Chowdhary |
| 6,295,454 B1 | 9/2001 | Havinis et al. |
| 6,298,306 B1 | 10/2001 | Suarez et al. |
| 6,304,758 B1 | 10/2001 | Iierbig et al. |
| 6,313,761 B1 | 11/2001 | Shinada |
| 6,314,369 B1 | 11/2001 | Ito et al. |
| 6,314,406 B1 | 11/2001 | O'Hagan et al. |
| 6,317,684 B1 | 11/2001 | Roeseler et al. |
| 6,321,158 B1 | 11/2001 | DeLorme et al. |
| 6,323,846 B1 | 11/2001 | Westerman et al. |
| 6,324,692 B1 | 11/2001 | Fiske |
| 6,326,918 B1 | 12/2001 | Stewart |
| 6,332,127 B1 | 12/2001 | Bandera et al. |
| 6,334,090 B1 | 12/2001 | Fujii |
| 6,339,437 B1 | 1/2002 | Nielsen |
| 6,339,746 B1 | 1/2002 | Sugiyama et al. |
| 6,343,317 B1 | 1/2002 | Glorikian |
| 6,345,288 B1 | 2/2002 | Reed et al. |
| 6,351,235 B1 | 2/2002 | Stilp |
| 6,353,398 B1 | 3/2002 | Amin et al. |
| 6,353,406 B1 | 3/2002 | Lanzl |
| 6,353,743 B1 | 3/2002 | Karmel |
| 6,353,837 B1 | 3/2002 | Blumenau |
| 6,356,761 B1 | 3/2002 | Huttunen et al. |
| 6,356,763 B1 | 3/2002 | Kangas et al. |
| 6,356,836 B1 | 3/2002 | Adolph |
| 6,356,838 B1 | 3/2002 | Paul |
| 6,370,629 B1 | 4/2002 | Hastings et al. |
| 6,377,810 B1 | 4/2002 | Geiger et al. |
| 6,377,886 B1 | 4/2002 | Gotou |
| 6,381,465 B1 | 4/2002 | Chern et al. |
| 6,381,539 B1 | 4/2002 | Shimazu |
| 6,381,603 B1 | 4/2002 | Chan et al. |
| 6,385,458 B1 | 5/2002 | Papadimitriou et al. |
| 6,385,465 B1 | 5/2002 | Yoshioka |
| 6,385,535 B2 | 5/2002 | Ohishi et al. |
| 6,389,288 B1 | 5/2002 | Kuwahara et al. |
| 6,401,027 B1 | 6/2002 | Xu et al. |
| 6,401,032 B1 | 6/2002 | Jamison et al. |
| 6,405,034 B1 | 6/2002 | Tijerino |
| 6,405,123 B1 | 6/2002 | Rennard et al. |
| 6,411,899 B2 | 6/2002 | Dussell et al. |
| 6,414,635 B1 | 7/2002 | Stewart et al. |
| 6,415,207 B1 | 7/2002 | Jones |
| 6,415,220 B1 | 7/2002 | Kovacs |
| 6,415,227 B1 | 7/2002 | Lin |
| 6,427,115 B1 | 7/2002 | Sekiyama |
| 6,430,411 B1 | 8/2002 | Lempio et al. |
| 6,434,530 B1 | 8/2002 | Sloane et al. |
| 6,438,490 B2 | 8/2002 | Ohta |
| 6,446,004 B1 | 9/2002 | Cao et al. |
| 6,449,485 B1 | 9/2002 | Anzil |
| 6,452,498 B2 | 9/2002 | Stewart |
| 6,456,234 B1 | 9/2002 | Johnson |
| 6,456,956 B1 | 9/2002 | Xiong |
| 6,459,782 B1 | 10/2002 | Bedrosian et al. |
| 6,463,289 B1 | 10/2002 | Havinis et al. |
| 6,477,581 B1 | 11/2002 | Carpenter et al. |
| 6,487,305 B2 | 11/2002 | Kambe et al. |
| 6,490,454 B1 | 12/2002 | Kangas et al. |
| 6,490,519 B1 | 12/2002 | Lapidot et al. |
| 6,501,421 B1 | 12/2002 | Dutta et al. |
| 6,502,033 B1 | 12/2002 | Phuyal |
| 6,505,046 B1 | 1/2003 | Baker |
| 6,505,048 B1 | 1/2003 | Moles et al. |
| 6,505,123 B1 | 1/2003 | Root et al. |
| 6,507,802 B1 | 1/2003 | Payton et al. |
| 6,516,197 B2 | 2/2003 | Havinis et al. |
| 6,519,463 B2 | 2/2003 | Tendler |
| 6,519,571 B1 | 2/2003 | Guheen et al. |
| 6,526,335 B1 | 2/2003 | Treyz et al. |
| 6,529,143 B2 | 3/2003 | Mikkola et al. |
| 6,535,140 B1 | 3/2003 | Goss et al. |
| 6,542,812 B1 | 4/2003 | Obradovich et al. |

(56) References Cited

U.S. PATENT DOCUMENTS

| | | |
|---|---|---|
| 6,542,819 B1 | 4/2003 | Kovacs et al. |
| 6,545,638 B2 | 4/2003 | Sladen |
| 6,546,336 B1 | 4/2003 | Matsuoka et al. |
| 6,546,360 B1 | 4/2003 | Gilbert et al. |
| 6,552,682 B1 | 4/2003 | Fan |
| 6,563,430 B1 | 5/2003 | Kemink et al. |
| 6,564,143 B1 | 5/2003 | Alewine et al. |
| 6,570,557 B1 | 5/2003 | Westerman et al. |
| 6,571,279 B1 | 5/2003 | Herz et al. |
| 6,574,484 B1 | 6/2003 | Carley |
| 6,574,550 B2 | 6/2003 | Hashida |
| 6,587,688 B1 | 7/2003 | Chambers et al. |
| 6,587,782 B1 | 7/2003 | Nocek et al. |
| 6,587,835 B1 | 7/2003 | Treyz et al. |
| 6,594,480 B1 | 7/2003 | Montalvo et al. |
| 6,597,305 B2 | 7/2003 | Szeto et al. |
| 6,611,687 B1 | 8/2003 | Clark et al. |
| 6,611,788 B1 | 8/2003 | Hussa |
| 6,615,131 B1 | 9/2003 | Rennard et al. |
| 6,615,213 B1 | 9/2003 | Johnson |
| 6,643,587 B2 | 11/2003 | Brodie et al. |
| 6,647,257 B2 | 11/2003 | Owensby |
| 6,650,902 B1 | 11/2003 | Richton |
| 6,650,997 B2 | 11/2003 | Funk |
| 6,662,016 B1 | 12/2003 | Buckham et al. |
| 6,662,023 B1 | 12/2003 | Helle |
| 6,667,963 B1 | 12/2003 | Rantalainen et al. |
| 6,671,377 B1 | 12/2003 | Havinis et al. |
| 6,674,849 B1 | 1/2004 | Froeberg |
| 6,677,894 B2 | 1/2004 | Sheynblat et al. |
| 6,678,516 B2 | 1/2004 | Nordman et al. |
| 6,679,932 B2 | 1/2004 | Birler et al. |
| 6,680,694 B1 | 1/2004 | Knockeart et al. |
| 6,681,120 B1 | 1/2004 | Kim |
| 6,683,538 B1 | 1/2004 | Wilkes, Jr. |
| 6,697,018 B2 | 2/2004 | Stewart |
| 6,697,734 B1 | 2/2004 | Suomela |
| 6,711,408 B1 | 3/2004 | Raith |
| 6,711,474 B1 | 3/2004 | Treyz et al. |
| 6,714,791 B2 | 3/2004 | Friedman |
| 6,718,344 B2 | 4/2004 | Hirono |
| 6,721,572 B1 | 4/2004 | Smith et al. |
| 6,731,236 B1 | 5/2004 | Hager et al. |
| 6,731,238 B2 | 5/2004 | Johnson |
| 6,732,047 B1 | 5/2004 | de Silva |
| 6,738,808 B1 | 5/2004 | Zellner et al. |
| 6,741,188 B1 | 5/2004 | Miller et al. |
| 6,741,926 B1 | 5/2004 | Zhao et al. |
| 6,748,226 B1 | 6/2004 | Wortham |
| 6,748,318 B1 | 6/2004 | Jones |
| 6,750,883 B1 | 6/2004 | Parupudi et al. |
| 6,759,960 B2 | 7/2004 | Stewart |
| 6,762,772 B1 | 7/2004 | Imamura et al. |
| 6,766,174 B1 | 7/2004 | Kenyon |
| 6,766,245 B2 | 7/2004 | Padmanabhan |
| 6,781,575 B1 | 8/2004 | Hawkins et al. |
| 6,782,278 B2 | 8/2004 | Chen et al. |
| 6,789,012 B1 | 9/2004 | Childs et al. |
| 6,795,686 B2 | 9/2004 | Master et al. |
| 6,801,855 B1 | 10/2004 | Walters et al. |
| 6,810,323 B1 | 10/2004 | Bullock et al. |
| 6,813,501 B2 | 11/2004 | Kinnunen et al. |
| 6,813,503 B1 | 11/2004 | Zillikens et al. |
| 6,813,582 B2 | 11/2004 | Levi et al. |
| 6,816,782 B1 | 11/2004 | Walters et al. |
| 6,819,919 B1 | 11/2004 | Tanaka |
| 6,823,188 B1 | 11/2004 | Stern |
| 6,834,195 B2 | 12/2004 | Brandenberg et al. |
| 6,845,318 B1 | 1/2005 | Moore et al. |
| 6,847,891 B2 | 1/2005 | Pietras et al. |
| 6,847,969 B1 | 1/2005 | Mathai et al. |
| 6,853,911 B1 | 2/2005 | Sakarya |
| 6,853,917 B2 | 2/2005 | Miwa |
| 6,859,149 B2 | 2/2005 | Ohta |
| 6,865,483 B1 | 3/2005 | Cook, III et al. |
| 6,868,074 B1 | 3/2005 | Hanson |
| 6,871,144 B1 | 3/2005 | Lee |
| 6,879,838 B2 | 4/2005 | Rankin et al. |
| 6,882,313 B1 | 4/2005 | Fan et al. |
| 6,888,536 B2 | 5/2005 | Westerman et al. |
| 6,909,902 B1 | 6/2005 | Sawada et al. |
| 6,912,398 B1 | 6/2005 | Domnitz |
| 6,914,626 B2 | 7/2005 | Squibbs |
| 6,915,208 B2 | 7/2005 | Garin et al. |
| 6,931,322 B2 | 8/2005 | Jung et al. |
| 6,933,841 B2 | 8/2005 | Muramatsu et al. |
| 6,941,222 B2 | 9/2005 | Yano et al. |
| 6,944,447 B2 | 9/2005 | Portman et al. |
| 6,948,656 B2 | 9/2005 | Williams |
| 6,950,746 B2 | 9/2005 | Yano et al. |
| 6,952,181 B2 | 10/2005 | Karr et al. |
| 6,954,646 B2 | 10/2005 | Churt |
| 6,954,735 B1 | 10/2005 | Djupsjobacka et al. |
| 6,957,072 B2 | 10/2005 | Kangras et al. |
| 6,975,959 B2 | 12/2005 | Dietrich et al. |
| 6,980,909 B2 | 12/2005 | Root et al. |
| 6,990,495 B1 | 1/2006 | Grason et al. |
| 6,999,779 B1 | 2/2006 | Hashimoto |
| 7,003,289 B1 | 2/2006 | Kolls |
| 7,009,556 B2 | 3/2006 | Stewart |
| 7,031,725 B2 | 4/2006 | Rorabaugh |
| 7,044,372 B2 | 5/2006 | Okuda et al. |
| 7,058,594 B2 | 6/2006 | Stewart |
| 7,069,319 B2 | 6/2006 | Zellner et al. |
| 7,076,255 B2 | 7/2006 | Parupudi et al. |
| 7,082,365 B2 | 7/2006 | Sheha et al. |
| 7,089,264 B1 | 8/2006 | Guido et al. |
| 7,096,029 B1 | 8/2006 | Parupudi et al. |
| 7,096,030 B2 | 8/2006 | Huomo |
| 7,103,470 B2 | 9/2006 | Mintz |
| 7,103,472 B2 | 9/2006 | Itabashi |
| 7,117,015 B2 | 10/2006 | Scheinert et al. |
| 7,120,469 B1 | 10/2006 | Urakawa |
| 7,123,189 B2 | 10/2006 | Lalik et al. |
| 7,123,926 B2 | 10/2006 | Himmelstein |
| 7,130,630 B1 | 10/2006 | Enzmann et al. |
| 7,130,743 B2 | 10/2006 | Kudo et al. |
| 7,136,853 B1 | 11/2006 | Kohda et al. |
| 7,146,298 B2 | 12/2006 | Motamedi et al. |
| 7,149,503 B2 | 12/2006 | Aarnio et al. |
| 7,151,921 B2 | 12/2006 | Otsuka |
| 7,165,725 B2 | 1/2007 | Casey |
| 7,171,190 B2 | 1/2007 | Ye et al. |
| 7,181,189 B2 | 2/2007 | Hotta et al. |
| 7,187,997 B2 | 3/2007 | Johnson |
| 7,200,409 B1 | 4/2007 | Ichikawa et al. |
| 7,200,566 B1 | 4/2007 | Moore et al. |
| 7,213,048 B1 | 5/2007 | Parupudi et al. |
| 7,215,967 B1 | 5/2007 | Kransmo et al. |
| 7,222,293 B1 | 5/2007 | Zapiec et al. |
| 7,236,883 B2 | 6/2007 | Garin et al. |
| 7,254,481 B2 | 8/2007 | Yamada et al. |
| 7,256,711 B2 | 8/2007 | Sheha et al. |
| 7,257,392 B2 | 8/2007 | Tang et al. |
| 7,260,378 B2 | 8/2007 | Holland et al. |
| 7,266,376 B2 | 9/2007 | Nakagawa |
| 7,269,601 B2 | 9/2007 | Kinno et al. |
| 7,271,765 B2 | 9/2007 | Stilp et al. |
| 7,272,403 B2 | 9/2007 | Creamer et al. |
| 7,272,404 B2 | 9/2007 | Overy et al. |
| 7,274,332 B1 | 9/2007 | Dupray |
| 7,274,939 B2 | 9/2007 | Ruutu et al. |
| 7,280,822 B2 | 10/2007 | Fraccaroli |
| 7,286,933 B2 | 10/2007 | Cho |
| 7,295,556 B2 | 11/2007 | Roese et al. |
| 7,295,925 B2 | 11/2007 | Breed et al. |
| 7,298,327 B2 | 11/2007 | Dupray et al. |
| 7,299,008 B2 | 11/2007 | Gluck |
| 7,310,516 B1 | 12/2007 | Vacanti et al. |
| 7,313,405 B2 | 12/2007 | Tanabe |
| 7,313,467 B2 | 12/2007 | Breed et al. |
| 7,319,412 B1 | 1/2008 | Coppinger et al. |
| 7,336,928 B2 | 2/2008 | Paalasmaa et al. |
| 7,336,949 B2 | 2/2008 | Nasielski |

(56) References Cited

U.S. PATENT DOCUMENTS

| | | | |
|---|---|---|---|
| 7,339,496 B2 | 3/2008 | Endo et al. | |
| 7,343,564 B2 | 3/2008 | Othmer | |
| 7,349,706 B2 | 3/2008 | Kim et al. | |
| 7,353,034 B2 | 4/2008 | Haney | |
| 7,359,713 B1 | 4/2008 | Tiwari | |
| 7,370,283 B2 | 5/2008 | Othmer | |
| 7,373,246 B2 | 5/2008 | O'Clair | |
| 7,386,396 B2 | 6/2008 | Johnson | |
| 7,389,179 B2 | 6/2008 | Jin et al. | |
| 7,392,017 B2 | 6/2008 | Chu et al. | |
| 7,395,031 B1 | 7/2008 | Ritter | |
| 7,418,402 B2 | 8/2008 | McCrossin et al. | |
| 7,421,422 B1 | 9/2008 | Dempster et al. | |
| 7,421,486 B1 | 9/2008 | Parupudi et al. | |
| 7,426,437 B2 | 9/2008 | Breed et al. | |
| 7,427,021 B2 | 9/2008 | Kemper et al. | |
| 7,433,694 B2 | 10/2008 | Morgan et al. | |
| 7,440,842 B1 | 10/2008 | Vorona | |
| 7,441,203 B2 | 10/2008 | Othmer et al. | |
| 7,466,235 B1 | 12/2008 | Kolb et al. | |
| 7,483,944 B2 | 1/2009 | Parupudi et al. | |
| 7,486,201 B2 | 2/2009 | Kelly et al. | |
| 7,500,607 B2 | 3/2009 | Williams | |
| 7,512,487 B1* | 3/2009 | Golding et al. | 701/424 |
| 7,522,927 B2 | 4/2009 | Fitch et al. | |
| 7,525,484 B2 | 4/2009 | Dupray et al. | |
| 7,536,388 B2 | 5/2009 | Jung et al. | |
| 7,545,281 B2 | 6/2009 | Richards et al. | |
| 7,558,696 B2 | 7/2009 | Vilppula et al. | |
| 7,565,132 B2 | 7/2009 | Ben Ayed | |
| 7,565,157 B1 | 7/2009 | Ortega et al. | |
| 7,574,222 B2 | 8/2009 | Sawada et al. | |
| 7,577,448 B2 | 8/2009 | Pande et al. | |
| 7,587,345 B2 | 9/2009 | Mann et al. | |
| 7,593,740 B2 | 9/2009 | Crowley et al. | |
| 7,593,991 B2 | 9/2009 | Friedman et al. | |
| 7,596,450 B2 | 9/2009 | Hong | |
| 7,599,795 B1 | 10/2009 | Blumberg et al. | |
| 7,603,233 B2 | 10/2009 | Tashiro | |
| 7,606,580 B2 | 10/2009 | Granito et al. | |
| 7,617,044 B2 | 11/2009 | Lee | |
| 7,620,404 B2 | 11/2009 | Chesnais et al. | |
| 7,623,848 B2 | 11/2009 | Rosenfelt et al. | |
| 7,624,358 B2 | 11/2009 | Kim et al. | |
| 7,647,174 B2 | 1/2010 | Kwon | |
| 7,680,591 B2 | 3/2010 | Nagata et al. | |
| 7,683,893 B2 | 3/2010 | Kim et al. | |
| 7,689,916 B1 | 3/2010 | Goel et al. | |
| 7,710,290 B2 | 5/2010 | Johnson | |
| 7,711,478 B2 | 5/2010 | Gluck | |
| 7,714,778 B2 | 5/2010 | Dupray | |
| 7,729,691 B2 | 6/2010 | Newville | |
| 7,739,040 B2 | 6/2010 | Horvitz | |
| 7,742,774 B2 | 6/2010 | Oh et al. | |
| 7,743,074 B1 | 6/2010 | Parupudi et al. | |
| 7,756,639 B2 | 7/2010 | Colley et al. | |
| 7,768,395 B2 | 8/2010 | Gold | |
| 7,783,421 B2 | 8/2010 | Arai et al. | |
| 7,792,273 B2 | 9/2010 | Fano et al. | |
| 7,811,203 B2 | 10/2010 | Unuma et al. | |
| 7,822,547 B2 | 10/2010 | Lindroos | |
| 7,840,347 B2 | 11/2010 | Noguchi | |
| 7,848,388 B2 | 12/2010 | Tudosoiu | |
| 7,848,765 B2 | 12/2010 | Phillips et al. | |
| 7,860,758 B2 | 12/2010 | McCrossin et al. | |
| 7,890,089 B1 | 2/2011 | Fujisaki | |
| 7,890,123 B2 | 2/2011 | Granito et al. | |
| 7,929,010 B2 | 4/2011 | Narasimhan | |
| 7,933,612 B2 | 4/2011 | Counts et al. | |
| 7,933,929 B1 | 4/2011 | McClendon et al. | |
| 7,941,188 B2 | 5/2011 | Jung et al. | |
| 7,962,280 B2 | 6/2011 | Kindo et al. | |
| 7,991,432 B2 | 8/2011 | Silverbrook et al. | |
| 8,031,050 B2 | 10/2011 | Johnson | |
| 8,036,630 B2 | 10/2011 | Park et al. | |
| 8,046,009 B2 | 10/2011 | Bodmer et al. | |
| 8,073,565 B2 | 12/2011 | Johnson | |
| 8,082,094 B2 | 12/2011 | Gao | |
| 8,095,152 B2 | 1/2012 | Sheha et al. | |
| 8,108,144 B2 | 1/2012 | Forstall et al. | |
| 8,229,458 B2 | 7/2012 | Busch | |
| 8,250,634 B2 | 8/2012 | Agarwal et al. | |
| 8,385,946 B2 | 2/2013 | Forstall et al. | |
| 8,386,655 B2 | 2/2013 | Luers | |
| 8,538,685 B2 | 9/2013 | Johnson | |
| 8,762,056 B2 | 6/2014 | Forstall et al. | |
| 8,774,825 B2 | 7/2014 | Forstall et al. | |
| 8,963,686 B2 | 2/2015 | Johnson | |
| 9,066,199 B2 | 6/2015 | Forstall et al. | |
| 9,100,793 B2 | 8/2015 | Johnson | |
| 9,109,904 B2 | 8/2015 | Forstall et al. | |
| 9,250,092 B2 | 2/2016 | Blumenberg et al. | |
| 2001/0018349 A1 | 8/2001 | Kinnunen et al. | |
| 2001/0043148 A1 | 11/2001 | Stewart | |
| 2001/0046884 A1 | 11/2001 | Yoshioka | |
| 2002/0026289 A1* | 2/2002 | Kuzunuki et al. | 702/150 |
| 2002/0030698 A1* | 3/2002 | Baur et al. | 345/733 |
| 2002/0032035 A1 | 3/2002 | Teshima | |
| 2002/0035493 A1 | 3/2002 | Mozayeny et al. | |
| 2002/0035609 A1 | 3/2002 | Lessard et al. | |
| 2002/0042266 A1 | 4/2002 | Heyward et al. | |
| 2002/0046069 A1 | 4/2002 | Mozayeny et al. | |
| 2002/0046077 A1 | 4/2002 | Mozayeny et al. | |
| 2002/0046084 A1 | 4/2002 | Steele et al. | |
| 2002/0055373 A1 | 5/2002 | King et al. | |
| 2002/0067353 A1 | 6/2002 | Kenyon et al. | |
| 2002/0077144 A1 | 6/2002 | Keller et al. | |
| 2002/0087505 A1 | 7/2002 | Smith et al. | |
| 2002/0091632 A1 | 7/2002 | Turock et al. | |
| 2002/0091991 A1 | 7/2002 | Castro | |
| 2002/0095486 A1 | 7/2002 | Bahl | |
| 2002/0098849 A1 | 7/2002 | Bloebaum et al. | |
| 2002/0118112 A1 | 8/2002 | Lang | |
| 2002/0126146 A1 | 9/2002 | Burns et al. | |
| 2002/0128773 A1 | 9/2002 | Chowanic et al. | |
| 2002/0132625 A1 | 9/2002 | Ogino et al. | |
| 2002/0140560 A1 | 10/2002 | Altman et al. | |
| 2002/0160815 A1 | 10/2002 | Patel et al. | |
| 2002/0164999 A1 | 11/2002 | Johnson | |
| 2002/0167442 A1 | 11/2002 | Taylor | |
| 2002/0173905 A1 | 11/2002 | Jin et al. | |
| 2002/0183927 A1 | 12/2002 | Odamura | |
| 2003/0001827 A1 | 1/2003 | Gould | |
| 2003/0006914 A1* | 1/2003 | Todoriki et al. | 340/995 |
| 2003/0008662 A1 | 1/2003 | Stern et al. | |
| 2003/0014181 A1 | 1/2003 | Myr | |
| 2003/0016804 A1 | 1/2003 | Sheha et al. | |
| 2003/0018427 A1 | 1/2003 | Yokota et al. | |
| 2003/0032404 A1 | 2/2003 | Wager et al. | |
| 2003/0055560 A1 | 3/2003 | Phillips et al. | |
| 2003/0060211 A1 | 3/2003 | Chern et al. | |
| 2003/0060212 A1 | 3/2003 | Thomas | |
| 2003/0060215 A1 | 3/2003 | Graham | |
| 2003/0060973 A1 | 3/2003 | Mathews et al. | |
| 2003/0060976 A1 | 3/2003 | Sato et al. | |
| 2003/0065934 A1 | 4/2003 | Angelo et al. | |
| 2003/0069029 A1 | 4/2003 | Dowling et al. | |
| 2003/0069683 A1 | 4/2003 | Lapidot et al. | |
| 2003/0078054 A1 | 4/2003 | Okuda | |
| 2003/0078055 A1 | 4/2003 | Smith et al. | |
| 2003/0078057 A1 | 4/2003 | Watanabe et al. | |
| 2003/0093217 A1 | 5/2003 | Petzold et al. | |
| 2003/0096620 A1 | 5/2003 | Ozturk et al. | |
| 2003/0100326 A1 | 5/2003 | Grube et al. | |
| 2003/0100334 A1 | 5/2003 | Mazzara, Jr. | |
| 2003/0101225 A1 | 5/2003 | Han et al. | |
| 2003/0105826 A1 | 6/2003 | Mayraz | |
| 2003/0120423 A1 | 6/2003 | Cochlovius et al. | |
| 2003/0134657 A1 | 7/2003 | Norta et al. | |
| 2003/0139150 A1 | 7/2003 | Rodriguez et al. | |
| 2003/0140136 A1 | 7/2003 | Nakamura | |
| 2003/0144793 A1 | 7/2003 | Melaku et al. | |
| 2003/0148774 A1 | 8/2003 | Naghian et al. | |
| 2003/0158655 A1 | 8/2003 | Obradovich et al. | |

(56) References Cited

U.S. PATENT DOCUMENTS

| | | |
|---|---|---|
| 2003/0191578 A1 | 10/2003 | Paulauskas et al. |
| 2003/0229446 A1* | 12/2003 | Boscamp et al. ............. 701/213 |
| 2003/0236106 A1 | 12/2003 | Master et al. |
| 2004/0010358 A1 | 1/2004 | Oesterling et al. |
| 2004/0019582 A1 | 1/2004 | Brown |
| 2004/0036649 A1 | 2/2004 | Taylor |
| 2004/0054428 A1 | 3/2004 | Sheha et al. |
| 2004/0059502 A1 | 3/2004 | Levi et al. |
| 2004/0068439 A1 | 4/2004 | Elgrably |
| 2004/0072557 A1 | 4/2004 | Paila et al. |
| 2004/0072577 A1 | 4/2004 | Myllymaki et al. |
| 2004/0073361 A1 | 4/2004 | Tzamaloukas et al. |
| 2004/0082351 A1 | 4/2004 | Westman |
| 2004/0083050 A1 | 4/2004 | Biyani |
| 2004/0093155 A1 | 5/2004 | Simonds |
| 2004/0093392 A1 | 5/2004 | Nagamatsu et al. |
| 2004/0093566 A1 | 5/2004 | McElligott |
| 2004/0098175 A1 | 5/2004 | Said et al. |
| 2004/0104842 A1 | 6/2004 | Drury et al. |
| 2004/0110488 A1 | 6/2004 | Komsi |
| 2004/0110515 A1 | 6/2004 | Blumberg et al. |
| 2004/0128066 A1 | 7/2004 | Kudo et al. |
| 2004/0128067 A1 | 7/2004 | Smith |
| 2004/0137893 A1 | 7/2004 | Muthuswamy et al. |
| 2004/0151151 A1 | 8/2004 | Kubler et al. |
| 2004/0158401 A1 | 8/2004 | Yoon |
| 2004/0158584 A1 | 8/2004 | Necsoiu et al. |
| 2004/0172409 A1 | 9/2004 | James |
| 2004/0176907 A1 | 9/2004 | Nesbitt |
| 2004/0180669 A1 | 9/2004 | Kall |
| 2004/0192299 A1 | 9/2004 | Wilson et al. |
| 2004/0192351 A1 | 9/2004 | Duncan |
| 2004/0198335 A1 | 10/2004 | Campen |
| 2004/0198379 A1 | 10/2004 | Magee et al. |
| 2004/0198397 A1 | 10/2004 | Weiss |
| 2004/0203569 A1 | 10/2004 | Jijina et al. |
| 2004/0203746 A1 | 10/2004 | Knauerhase et al. |
| 2004/0203836 A1 | 10/2004 | Gorday et al. |
| 2004/0203880 A1 | 10/2004 | Riley |
| 2004/0203909 A1 | 10/2004 | Koster |
| 2004/0204842 A1 | 10/2004 | Shinozaki |
| 2004/0215707 A1 | 10/2004 | Fujita et al. |
| 2004/0225436 A1 | 11/2004 | Yoshihashi |
| 2004/0228330 A1 | 11/2004 | Kubler et al. |
| 2004/0236504 A1 | 11/2004 | Bickford et al. |
| 2004/0242149 A1 | 12/2004 | Luneau |
| 2004/0246940 A1 | 12/2004 | Kubler et al. |
| 2004/0248586 A1 | 12/2004 | Patel et al. |
| 2004/0260457 A1 | 12/2004 | Kawase et al. |
| 2004/0260939 A1 | 12/2004 | Ichikawa et al. |
| 2004/0263084 A1 | 12/2004 | Mor et al. |
| 2004/0264442 A1 | 12/2004 | Kubler et al. |
| 2005/0002419 A1 | 1/2005 | Doviak et al. |
| 2005/0004838 A1 | 1/2005 | Perkowski et al. |
| 2005/0009511 A1 | 1/2005 | Bostrom et al. |
| 2005/0020223 A1 | 1/2005 | Ellis et al. |
| 2005/0020315 A1 | 1/2005 | Robertson et al. |
| 2005/0027442 A1 | 2/2005 | Kelley et al. |
| 2005/0033509 A1 | 2/2005 | Clapper |
| 2005/0033515 A1 | 2/2005 | Bozzone |
| 2005/0037781 A1 | 2/2005 | Ozugur et al. |
| 2005/0039140 A1 | 2/2005 | Chen |
| 2005/0046584 A1 | 3/2005 | Breed |
| 2005/0071078 A1 | 3/2005 | Yamada et al. |
| 2005/0071702 A1 | 3/2005 | Morisawa |
| 2005/0075116 A1 | 4/2005 | Laird |
| 2005/0085272 A1 | 4/2005 | Anderson et al. |
| 2005/0091408 A1 | 4/2005 | Parupudi et al. |
| 2005/0096840 A1 | 5/2005 | Simske |
| 2005/0114021 A1 | 5/2005 | Krull et al. |
| 2005/0130677 A1 | 6/2005 | Meunier et al. |
| 2005/0134440 A1 | 6/2005 | Breed |
| 2005/0134578 A1 | 6/2005 | Chambers et al. |
| 2005/0149250 A1 | 7/2005 | Isaac |
| 2005/0153681 A1 | 7/2005 | Hanson |
| 2005/0176411 A1 | 8/2005 | Taya |
| 2005/0186954 A1 | 8/2005 | Kenney |
| 2005/0190789 A1 | 9/2005 | Salkini et al. |
| 2005/0192025 A1 | 9/2005 | Kaplan |
| 2005/0197767 A1 | 9/2005 | Nortrup |
| 2005/0203698 A1 | 9/2005 | Lee |
| 2005/0216184 A1* | 9/2005 | Ehlers .......................... 701/200 |
| 2005/0221799 A1 | 10/2005 | Tervo et al. |
| 2005/0221808 A1 | 10/2005 | Karlsson et al. |
| 2005/0221843 A1 | 10/2005 | Friedman et al. |
| 2005/0222756 A1 | 10/2005 | Davis et al. |
| 2005/0222763 A1 | 10/2005 | Uyeki |
| 2005/0227709 A1 | 10/2005 | Chang et al. |
| 2005/0228553 A1* | 10/2005 | Tryon ............................ 701/22 |
| 2005/0228860 A1 | 10/2005 | Hamynen et al. |
| 2005/0234637 A1 | 10/2005 | Obradovich et al. |
| 2005/0239477 A1 | 10/2005 | Kim et al. |
| 2005/0250440 A1 | 11/2005 | Zhou et al. |
| 2005/0256639 A1 | 11/2005 | Aleksic et al. |
| 2005/0267676 A1 | 12/2005 | Nezu et al. |
| 2005/0272473 A1 | 12/2005 | Sheena et al. |
| 2005/0286421 A1 | 12/2005 | Janacek |
| 2006/0009908 A1 | 1/2006 | Tomita et al. |
| 2006/0015249 A1 | 1/2006 | Gieseke |
| 2006/0022048 A1 | 2/2006 | Johnson |
| 2006/0025158 A1 | 2/2006 | Leblanc et al. |
| 2006/0026536 A1 | 2/2006 | Hotelling et al. |
| 2006/0029109 A1 | 2/2006 | Moran |
| 2006/0038719 A1 | 2/2006 | Pande et al. |
| 2006/0041374 A1 | 2/2006 | Inoue |
| 2006/0041377 A1 | 2/2006 | Jung et al. |
| 2006/0041378 A1 | 2/2006 | Cheng et al. |
| 2006/0056388 A1 | 3/2006 | Livingwood |
| 2006/0058955 A1 | 3/2006 | Mehren |
| 2006/0063539 A1 | 3/2006 | Beyer, Jr. |
| 2006/0064239 A1 | 3/2006 | Ishii |
| 2006/0068809 A1 | 3/2006 | Wengler et al. |
| 2006/0069503 A1 | 3/2006 | Suomela |
| 2006/0072542 A1 | 4/2006 | Sinnreich et al. |
| 2006/0084414 A1 | 4/2006 | Alberth, Jr. et al. |
| 2006/0085392 A1 | 4/2006 | Wang et al. |
| 2006/0094353 A1 | 5/2006 | Neilsen et al. |
| 2006/0101005 A1 | 5/2006 | Yang et al. |
| 2006/0111122 A1 | 5/2006 | Carlson et al. |
| 2006/0116137 A1 | 6/2006 | Jung |
| 2006/0116965 A1 | 6/2006 | Kudo et al. |
| 2006/0148463 A1 | 7/2006 | Zhu et al. |
| 2006/0149461 A1 | 7/2006 | Rowley |
| 2006/0150119 A1 | 7/2006 | Chesnais et al. |
| 2006/0156209 A1 | 7/2006 | Matsuura et al. |
| 2006/0166679 A1 | 7/2006 | Karaoguz et al. |
| 2006/0168300 A1 | 7/2006 | An et al. |
| 2006/0172769 A1 | 8/2006 | Oh |
| 2006/0172778 A1 | 8/2006 | Sundararajan et al. |
| 2006/0179114 A1 | 8/2006 | Deeds |
| 2006/0180649 A1 | 8/2006 | Casey |
| 2006/0183486 A1 | 8/2006 | Mullen |
| 2006/0184320 A1 | 8/2006 | Hong |
| 2006/0184978 A1 | 8/2006 | Casey |
| 2006/0195481 A1 | 8/2006 | Arrouye et al. |
| 2006/0199567 A1 | 9/2006 | Alston |
| 2006/0199612 A1 | 9/2006 | Beyer et al. |
| 2006/0202819 A1 | 9/2006 | Adamczyk et al. |
| 2006/0206264 A1 | 9/2006 | Rasmussen |
| 2006/0211453 A1 | 9/2006 | Schick |
| 2006/0218209 A1 | 9/2006 | Arrouye et al. |
| 2006/0223518 A1 | 10/2006 | Haney |
| 2006/0227047 A1 | 10/2006 | Rosenberg |
| 2006/0229802 A1 | 10/2006 | Vertelney et al. |
| 2006/0229889 A1 | 10/2006 | Hodjat et al. |
| 2006/0247855 A1 | 11/2006 | de Silva et al. |
| 2006/0251034 A1 | 11/2006 | Park |
| 2006/0270421 A1 | 11/2006 | Phillips et al. |
| 2006/0271280 A1 | 11/2006 | O'Clair |
| 2006/0284767 A1 | 12/2006 | Taylor |
| 2006/0286971 A1 | 12/2006 | Maly et al. |
| 2006/0287824 A1 | 12/2006 | Lin |
| 2006/0291639 A1 | 12/2006 | Radziewicz et al. |
| 2006/0293029 A1 | 12/2006 | Jha et al. |

(56) References Cited

U.S. PATENT DOCUMENTS

| | | |
|---|---|---|
| 2006/0293083 A1 | 12/2006 | Bowen |
| 2007/0001875 A1 | 1/2007 | Taylor |
| 2007/0003040 A1 | 1/2007 | Radziewicz et al. |
| 2007/0005188 A1 | 1/2007 | Johnson |
| 2007/0005233 A1 | 1/2007 | Pinkus et al. |
| 2007/0006098 A1 | 1/2007 | Krumm et al. |
| 2007/0008515 A1 | 1/2007 | Otani et al. |
| 2007/0010942 A1 | 1/2007 | Bill |
| 2007/0016362 A1 | 1/2007 | Nelson |
| 2007/0027614 A1 | 2/2007 | Reeser et al. |
| 2007/0027628 A1 | 2/2007 | Geelen |
| 2007/0038364 A1 | 2/2007 | Lee et al. |
| 2007/0038369 A1 | 2/2007 | Devries et al. |
| 2007/0042790 A1 | 2/2007 | Mohi et al. |
| 2007/0055684 A1 | 3/2007 | Stevens |
| 2007/0060328 A1 | 3/2007 | Zrike et al. |
| 2007/0061245 A1 | 3/2007 | Ramer et al. |
| 2007/0061301 A1 | 3/2007 | Ramer et al. |
| 2007/0061363 A1 | 3/2007 | Ramer et al. |
| 2007/0071114 A1 | 3/2007 | Sanderford et al. |
| 2007/0073480 A1 | 3/2007 | Singh |
| 2007/0073719 A1 | 3/2007 | Ramer et al. |
| 2007/0087726 A1 | 4/2007 | McGary et al. |
| 2007/0093258 A1 | 4/2007 | Steenstra et al. |
| 2007/0093955 A1 | 4/2007 | Hughes |
| 2007/0106465 A1 | 5/2007 | Adam et al. |
| 2007/0106466 A1 | 5/2007 | Noguchi |
| 2007/0109323 A1 | 5/2007 | Nakashima |
| 2007/0115868 A1 | 5/2007 | Chen et al. |
| 2007/0123280 A1 | 5/2007 | McGary et al. |
| 2007/0124043 A1 | 5/2007 | Ayoub et al. |
| 2007/0124058 A1 | 5/2007 | Kitagawa et al. |
| 2007/0124066 A1 | 5/2007 | Kikuchi et al. |
| 2007/0127661 A1 | 6/2007 | Didcock |
| 2007/0129888 A1 | 6/2007 | Rosenberg |
| 2007/0130153 A1 | 6/2007 | Nachman et al. |
| 2007/0135136 A1 | 6/2007 | Ische |
| 2007/0135990 A1 | 6/2007 | Seymour et al. |
| 2007/0142026 A1 | 6/2007 | Kuz et al. |
| 2007/0146342 A1 | 6/2007 | Medler et al. |
| 2007/0149212 A1 | 6/2007 | Gupta et al. |
| 2007/0150174 A1 | 6/2007 | Seymour et al. |
| 2007/0150192 A1 | 6/2007 | Wakamatsu et al. |
| 2007/0150320 A1 | 6/2007 | Huang |
| 2007/0153983 A1 | 7/2007 | Bloebaum et al. |
| 2007/0153984 A1 | 7/2007 | Bloebaum et al. |
| 2007/0153986 A1 | 7/2007 | Bloebaum et al. |
| 2007/0155360 A1 | 7/2007 | An |
| 2007/0155404 A1 | 7/2007 | Yamane et al. |
| 2007/0156326 A1 | 7/2007 | Nesbitt |
| 2007/0156337 A1 | 7/2007 | Yanni |
| 2007/0162224 A1 | 7/2007 | Luo |
| 2007/0179854 A1 | 8/2007 | Ziv et al. |
| 2007/0184855 A1 | 8/2007 | Klassen |
| 2007/0191029 A1 | 8/2007 | Zarem et al. |
| 2007/0198304 A1 | 8/2007 | Cohen et al. |
| 2007/0200713 A1 | 8/2007 | Weber et al. |
| 2007/0202887 A1 | 8/2007 | Counts et al. |
| 2007/0204162 A1 | 8/2007 | Rodriguez |
| 2007/0204218 A1 | 8/2007 | Weber et al. |
| 2007/0206730 A1 | 9/2007 | Polk |
| 2007/0208492 A1 | 9/2007 | Downs et al. |
| 2007/0208497 A1 | 9/2007 | Downs et al. |
| 2007/0208498 A1 | 9/2007 | Barker et al. |
| 2007/0208507 A1 | 9/2007 | Gotoh |
| 2007/0218925 A1 | 9/2007 | Islam et al. |
| 2007/0219706 A1 | 9/2007 | Sheynblat |
| 2007/0219708 A1 | 9/2007 | Brasche et al. |
| 2007/0229549 A1 | 10/2007 | Dicke et al. |
| 2007/0232272 A1 | 10/2007 | Gonsalves et al. |
| 2007/0232326 A1 | 10/2007 | Johnson |
| 2007/0233387 A1 | 10/2007 | Johnson |
| 2007/0237096 A1 | 10/2007 | Vengroff et al. |
| 2007/0238491 A1 | 10/2007 | He |
| 2007/0243853 A1 | 10/2007 | Bumiller et al. |
| 2007/0247435 A1 | 10/2007 | Benko et al. |
| 2007/0254676 A1 | 11/2007 | Pedigo et al. |
| 2007/0259674 A1 | 11/2007 | Neef et al. |
| 2007/0260751 A1 | 11/2007 | Meesseman |
| 2007/0266116 A1 | 11/2007 | Rensin et al. |
| 2007/0270159 A1 | 11/2007 | Lohtia et al. |
| 2007/0271328 A1 | 11/2007 | Geelen et al. |
| 2007/0276586 A1 | 11/2007 | Jeon et al. |
| 2007/0276587 A1 | 11/2007 | Johnson |
| 2007/0276596 A1 | 11/2007 | Solomon et al. |
| 2007/0281664 A1 | 12/2007 | Kaneko et al. |
| 2007/0282521 A1 | 12/2007 | Broughton |
| 2007/0282565 A1 | 12/2007 | Bye et al. |
| 2007/0290920 A1 | 12/2007 | Shintai et al. |
| 2007/0296573 A1 | 12/2007 | Schlesier et al. |
| 2007/0299601 A1 | 12/2007 | Zhao et al. |
| 2008/0004789 A1 | 1/2008 | Horvitz et al. |
| 2008/0004791 A1 | 1/2008 | Sera |
| 2008/0004802 A1 | 1/2008 | Horvitz |
| 2008/0005104 A1 | 1/2008 | Flake et al. |
| 2008/0005301 A1 | 1/2008 | Li et al. |
| 2008/0015422 A1 | 1/2008 | Wessel |
| 2008/0019335 A1 | 1/2008 | Wallace et al. |
| 2008/0021632 A1 | 1/2008 | Amano |
| 2008/0024360 A1 | 1/2008 | Taylor |
| 2008/0024364 A1 | 1/2008 | Taylor |
| 2008/0027636 A1 | 1/2008 | Tengler et al. |
| 2008/0030308 A1 | 2/2008 | Johnson |
| 2008/0032703 A1 | 2/2008 | Krumm et al. |
| 2008/0032721 A1 | 2/2008 | MacDonald et al. |
| 2008/0045234 A1 | 2/2008 | Reed |
| 2008/0046176 A1 | 2/2008 | Jurgens |
| 2008/0052407 A1 | 2/2008 | Baudino et al. |
| 2008/0055154 A1 | 3/2008 | Martucci et al. |
| 2008/0065311 A1 | 3/2008 | Bauchot et al. |
| 2008/0070593 A1 | 3/2008 | Altman et al. |
| 2008/0071466 A1 | 3/2008 | Downs et al. |
| 2008/0082254 A1 | 4/2008 | Huhtala et al. |
| 2008/0085727 A1 | 4/2008 | Kratz |
| 2008/0086240 A1 | 4/2008 | Breed |
| 2008/0086455 A1 | 4/2008 | Meisels et al. |
| 2008/0088486 A1 | 4/2008 | Rozum et al. |
| 2008/0091347 A1 | 4/2008 | Tashiro |
| 2008/0096518 A1 | 4/2008 | Mock et al. |
| 2008/0097698 A1 | 4/2008 | Arnold-Huyser et al. |
| 2008/0098090 A1 | 4/2008 | Geraci et al. |
| 2008/0104634 A1 | 5/2008 | Gajdos et al. |
| 2008/0109153 A1 | 5/2008 | Gueziec |
| 2008/0113672 A1 | 5/2008 | Karr et al. |
| 2008/0119200 A1 | 5/2008 | McConnel |
| 2008/0129528 A1 | 6/2008 | Guthrie |
| 2008/0132243 A1 | 6/2008 | Spalink et al. |
| 2008/0132251 A1 | 6/2008 | Altman et al. |
| 2008/0132252 A1 | 6/2008 | Altman et al. |
| 2008/0140308 A1 | 6/2008 | Yamane et al. |
| 2008/0140520 A1 | 6/2008 | Hyder et al. |
| 2008/0153512 A1 | 6/2008 | Kale et al. |
| 2008/0153513 A1 | 6/2008 | Flake et al. |
| 2008/0155453 A1 | 6/2008 | Othmer |
| 2008/0160956 A1 | 7/2008 | Jackson et al. |
| 2008/0161034 A1 | 7/2008 | Akiyama |
| 2008/0167078 A1 | 7/2008 | Eibye |
| 2008/0167083 A1 | 7/2008 | Wyld et al. |
| 2008/0167796 A1 | 7/2008 | Narayanaswami |
| 2008/0167811 A1 | 7/2008 | Geelen |
| 2008/0168347 A1 | 7/2008 | Hallyn |
| 2008/0172173 A1 | 7/2008 | Chang et al. |
| 2008/0172361 A1 | 7/2008 | Wong et al. |
| 2008/0172374 A1 | 7/2008 | Wolosin et al. |
| 2008/0176545 A1 | 7/2008 | Dicke et al. |
| 2008/0177793 A1 | 7/2008 | Epstein et al. |
| 2008/0178116 A1 | 7/2008 | Kim |
| 2008/0186162 A1 | 8/2008 | Rajan et al. |
| 2008/0189033 A1 | 8/2008 | Geelen et al. |
| 2008/0194273 A1 | 8/2008 | Kansal et al. |
| 2008/0200142 A1 | 8/2008 | Abdel-Kader et al. |
| 2008/0207167 A1 | 8/2008 | Bugenhagen |
| 2008/0209344 A1* | 8/2008 | Knapp et al. ............... 715/751 |
| 2008/0225779 A1 | 9/2008 | Bragiel et al. |

(56) References Cited

U.S. PATENT DOCUMENTS

| | | |
|---|---|---|
| 2008/0227473 A1 | 9/2008 | Haney |
| 2008/0233919 A1 | 9/2008 | Kenney |
| 2008/0242312 A1 | 10/2008 | Paulson et al. |
| 2008/0248815 A1 | 10/2008 | Busch |
| 2008/0249667 A1 | 10/2008 | Horvitz et al. |
| 2008/0249983 A1 | 10/2008 | Meisels et al. |
| 2008/0268876 A1 | 10/2008 | Gelfand et al. |
| 2008/0271072 A1 | 10/2008 | Rothschild et al. |
| 2008/0280600 A1 | 11/2008 | Zhou |
| 2008/0284642 A1 | 11/2008 | Seacat et al. |
| 2008/0287124 A1 | 11/2008 | Karabinis |
| 2008/0288166 A1 | 11/2008 | Onishi |
| 2008/0293397 A1 | 11/2008 | Gajdos et al. |
| 2008/0301144 A1 | 12/2008 | Boss et al. |
| 2008/0310850 A1 | 12/2008 | Pederson et al. |
| 2008/0318550 A1 | 12/2008 | DeAtley |
| 2008/0319644 A1 | 12/2008 | Zehler |
| 2008/0319652 A1 | 12/2008 | Moshfeghi |
| 2009/0003659 A1 | 1/2009 | Forstall et al. |
| 2009/0005005 A1 | 1/2009 | Forstall et al. |
| 2009/0005018 A1 | 1/2009 | Forstall et al. |
| 2009/0005021 A1 | 1/2009 | Forstall et al. |
| 2009/0005068 A1 | 1/2009 | Forstall et al. |
| 2009/0005070 A1 | 1/2009 | Forstall et al. |
| 2009/0005071 A1 | 1/2009 | Forstall et al. |
| 2009/0005072 A1 | 1/2009 | Forstall et al. |
| 2009/0005076 A1 | 1/2009 | Forstall et al. |
| 2009/0005080 A1 | 1/2009 | Forstall et al. |
| 2009/0005082 A1 | 1/2009 | Forstall et al. |
| 2009/0005964 A1 | 1/2009 | Forstall et al. |
| 2009/0005965 A1 | 1/2009 | Forstall et al. |
| 2009/0005975 A1 | 1/2009 | Forstall et al. |
| 2009/0005978 A1 | 1/2009 | Forstall et al. |
| 2009/0005981 A1 | 1/2009 | Forstall et al. |
| 2009/0006336 A1 | 1/2009 | Forstall et al. |
| 2009/0030605 A1 | 1/2009 | Breed |
| 2009/0031006 A1 | 1/2009 | Johnson |
| 2009/0033540 A1 | 2/2009 | Breed et al. |
| 2009/0042585 A1 | 2/2009 | Matsuda |
| 2009/0197612 A1 | 8/2009 | Kiiskinen |
| 2009/0228961 A1 | 9/2009 | Wald et al. |
| 2009/0234743 A1 | 9/2009 | Wald et al. |
| 2009/0259573 A1 | 10/2009 | Cheng et al. |
| 2009/0271271 A1 | 10/2009 | Johnson |
| 2010/0082820 A1 | 4/2010 | Furukawa |
| 2010/0106397 A1 | 4/2010 | Van Essen |
| 2010/0128935 A1 | 5/2010 | Filley et al. |
| 2010/0131584 A1 | 5/2010 | Johnson |
| 2010/0173647 A1 | 7/2010 | Sheynblat |
| 2010/0207782 A1 | 8/2010 | Johnson |
| 2010/0285817 A1 | 11/2010 | Zhao et al. |
| 2011/0051658 A1 | 3/2011 | Jin et al. |
| 2011/0159887 A1 | 6/2011 | Lohtia et al. |
| 2011/0276591 A1 | 11/2011 | Bliss et al. |
| 2012/0270567 A1 | 10/2012 | Johnson |
| 2013/0225203 A1 | 8/2013 | Johnson |
| 2014/0066100 A1 | 3/2014 | Johnson |

FOREIGN PATENT DOCUMENTS

| | | |
|---|---|---|
| CA | 2287596 | 4/2000 |
| CA | 2432239 | 12/2004 |
| CN | 1 412 573 | 4/2003 |
| DE | 3 621 456 | 1/1988 |
| DE | 4437360 | 4/1996 |
| DE | 19506890 | 8/1996 |
| DE | 19914257 | 1/2000 |
| DE | 10 141 695 | 3/2003 |
| EP | 0 288 068 | 7/1992 |
| EP | 05-071974 | 3/1993 |
| EP | 0 633 452 | 1/1995 |
| EP | 0 745 867 | 12/1996 |
| EP | 0 762 362 | 3/1997 |
| EP | 0 763 749 | 3/1997 |
| EP | 0 785 535 | 7/1997 |
| EP | 0 786 646 | 7/1997 |
| EP | 0 809 117 | 11/1997 |
| EP | 0 813 072 | 12/1997 |
| EP | 0 699 330 | 4/1998 |
| EP | 0 908 835 | 4/1999 |
| EP | 0 997 808 | 5/2000 |
| EP | 1 083 764 | 3/2001 |
| EP | 1 251 362 | 10/2002 |
| EP | 1 300 652 | 4/2003 |
| EP | 1 406 617 | 3/2004 |
| EP | 1 437 573 | 7/2004 |
| EP | 1 457 928 | 9/2004 |
| EP | 1 465 041 | 10/2004 |
| EP | 1 469 287 | 10/2004 |
| EP | 1 496 338 | 1/2005 |
| EP | 1 659 817 | 5/2006 |
| EP | 1 672 474 | 6/2006 |
| EP | 1 770 956 | 4/2007 |
| EP | 1 790 947 | 5/2007 |
| EP | 1 860 904 | 11/2007 |
| EP | 1 944 701 | 7/2008 |
| EP | 1 933 249 | 8/2008 |
| EP | 1 975 567 | 10/2008 |
| FR | 2730083 | 8/1996 |
| FR | 2754093 | 4/1998 |
| FR | 2772911 | 6/1999 |
| FR | 2810183 | 12/2001 |
| GB | 2 278 196 | 11/1994 |
| GB | 2 322 248 | 8/1998 |
| GB | 2 359 888 | 9/2001 |
| GB | 2 407 230 | 4/2005 |
| JP | 62142215 | 6/1987 |
| JP | 5-191504 | 7/1993 |
| JP | 08-069436 | 3/1996 |
| JP | 8510578 | 11/1996 |
| JP | 09-054895 | 2/1997 |
| JP | 9-062993 | 3/1997 |
| JP | 9-80144 | 3/1997 |
| JP | 09-098474 | 4/1997 |
| JP | 9-113288 | 5/1997 |
| JP | 09-153125 | 6/1997 |
| JP | 09-200850 | 7/1997 |
| JP | 9-210710 | 8/1997 |
| JP | 9-319300 | 12/1997 |
| JP | 10-021259 | 1/1998 |
| JP | 10-030933 | 2/1998 |
| JP | 11-234736 | 8/1999 |
| JP | 2000-163379 | 6/2000 |
| JP | 2001-008270 | 1/2001 |
| JP | 2001-160063 | 6/2001 |
| JP | 2001-313972 | 11/2001 |
| JP | 2002-174524 | 6/2002 |
| JP | 2002-310680 | 10/2002 |
| JP | 2002-329296 | 11/2002 |
| JP | 2003-228532 | 8/2003 |
| JP | 2004-045054 | 2/2004 |
| JP | 2004-219146 | 8/2004 |
| JP | 2004-362271 | 12/2004 |
| JP | 2005-106741 | 4/2005 |
| JP | 2005-182146 | 7/2005 |
| JP | 2005-241519 | 9/2005 |
| JP | 2005/277764 | 10/2005 |
| JP | 2006-112338 | 4/2006 |
| JP | 2006-184007 | 7/2006 |
| JP | 2006-270889 | 10/2006 |
| JP | 2006-279838 | 10/2006 |
| JP | 2007-033220 | 2/2007 |
| JP | 2007-033331 | 2/2007 |
| JP | 2007-033368 | 2/2007 |
| JP | 2007-127439 | 5/2007 |
| JP | 2007-147439 | 6/2007 |
| JP | 2007-201699 | 8/2007 |
| JP | 2007-221433 | 8/2007 |
| JP | 2007-240400 | 9/2007 |
| JP | 2007-259291 | 10/2007 |
| JP | 2007-271299 | 10/2007 |
| JP | 2007-304009 | 11/2007 |
| JP | 2008-058917 | 3/2008 |
| JP | 2008-129774 | 6/2008 |

(56) References Cited

FOREIGN PATENT DOCUMENTS

| | | |
|---|---|---|
| KR | 2004-102440 | 12/2004 |
| KR | 2005-096746 | 10/2005 |
| TW | 200426387 | 12/2004 |
| WO | WO 93/20546 | 10/1993 |
| WO | WO 94/08250 | 4/1994 |
| WO | WO 97/07467 | 2/1997 |
| WO | WO 97/24577 | 7/1997 |
| WO | WO 97/41654 | 11/1997 |
| WO | WO 98/03951 | 1/1998 |
| WO | WO 98/07112 | 2/1998 |
| WO | WO 98/54682 | 12/1998 |
| WO | WO 99/16036 | 4/1999 |
| WO | WO 99/44183 | 9/1999 |
| WO | WO 99/61934 | 12/1999 |
| WO | WO 01/31966 | 5/2001 |
| WO | WO 01/37597 | 5/2001 |
| WO | WO 01/55994 | 8/2001 |
| WO | WO 02/33533 | 4/2002 |
| WO | WO 02/054813 | 7/2002 |
| WO | WO 03/023593 | 3/2003 |
| WO | WO 03/096055 | 11/2003 |
| WO | WO 2004/008792 | 1/2004 |
| WO | WO 2004/016032 | 2/2004 |
| WO | WO 2004/021730 | 3/2004 |
| WO | WO 2004/034194 | 4/2004 |
| WO | WO 2004/061576 | 7/2004 |
| WO | WO 2004/076977 | 9/2004 |
| WO | WO 2005/006258 | 1/2005 |
| WO | WO 2005/084052 | 9/2005 |
| WO | WO 2006/065856 | 6/2006 |
| WO | WO 2006/113125 | 10/2006 |
| WO | WO 2007/021071 | 2/2007 |
| WO | WO 2007/027065 | 3/2007 |
| WO | WO 2007/052285 | 5/2007 |
| WO | WO 2008/051929 | 5/2008 |
| WO | WO 2008/085740 | 7/2008 |
| WO | WO 2009/002942 | 12/2008 |
| WO | WO 2009/140031 | 11/2009 |

OTHER PUBLICATIONS

"3rd Generation Partnership Project (3GPP); Technical Specification Group (TSG) RAN; Working Group 2 (WG2); Report on Location Services," TS RAN R2.03 V0.1.0, Apr. 1999, 43 pages.
"3rd Generation Partnership Project; Technical Specification Group Radio Access Network; Stage 2 Functional Specification of Location Services in UTRAN," 3G TS 25.305 v.3.1.0, Mar. 2000, 45 pages.
"3rd Generation Partnership Project; Technical Specification Group Services and System Aspects; Functional stage 2 description of location services in UMTS," 3G TS 23.171 v.1.1.0, Nov. 1999, 42 pages.
"Animated Transition," [online] [Retrieved on Oct. 16, 2006]; Retrieved from the Internet URL: http://designinginterfaces.com/Animated_Transition; 2 pages.
"DaimlerCrysler Guide5 Usecases Overview Map," 1 page.
Digital cellular telecommunications system (Phase 2+); Location Services (LCS); Service description, Stage 1 (GSM 02.71) ETSI, Apr. 1999, 22 pages.
"Enabling UMTS / Third Generation Services and Applications," No. 11 Report from the UMTS Forum, Oct. 2000, 72 pages.
"Error: could not find a contact with this e-mail address." Outlookbanter.com. Dec. 2006, 12 pages.
"Estonian operator to launch world's first Network-based location services," Ericsson Press Release, Oct. 11, 1999, 2 pages.
"FM 3-25.26 Map Reading and Land Navigation," Headquarters Department of the Army, Washington, DC [online] [Retrieved on Apr. 9, 2004]; Retrieved from the Internet URL: http://155.217.58.58/cgi-bin/atdl.dll/fm/3-25.26/toc.htm; Jul. 20, 2001, pp. 1-7 and J-1 to J-3.
"Frontiers in Electronic Media," *Interactions*, 1997, 4(4):32-64.
"GPS 12 Personal NavigatorTM Owner's Manual & Reference", Garmin Corporation, 1999, 66 pages.
"International Numbering and SMS—Type of Numbering, TON, Numbering Plan Indicator, NPI," *ActiveXperts SMS and Pager Toolkit 4.1*, [online] [Retrieved on Jan. 5, 2007]; Retrieved from the Internet URL: http://www.activexperts.com/support/activsms/ton-npi/; 2 pages.
"International Roaming Guide—Personal Experience(s) from Customer and Community Member," [online] [Retrieved Jun. 26, 2006]; Retrieved from the Internet URL: http://forums.cingular.com/cng/board/message?board.id=international&message.id=1185; 6 pages.
"iPhone Software/Hardware Hack: LocoGPS—GPS Add-on for the iPhone," [online] [Retrieved on Dec. 25, 2007]; Retrieved from the Internet URL: http://www.iphonehacks.com/iphone_applications/index.html; 41 pages.
"LaBarge in joint venture on bus system," Internet: URL: http://www.bizjournals.com/stlouis/stories/1998/08/10/focus2.html?t-printable, Aug. 7, 1998, 1 page.
"New Handsets Strut Their Stuff at Wireless '99," Internet: URL: http://findarticles.com/p/articles/mi_m0BMD/is_1999_Feb_11/ai_n27547656/ downloaded from Internet on Feb. 11, 1999, 3 pages.
"New program for mobile blogging for Pocket PC released: My Blog," [online] [Retrieved on Apr. 5, 2006]; Retrieved from the Internet URL: http://msmobiles.com/news.php/4067.html; 1 page.
"Numbering and Dialing Plan Within the United States," *Alliance for Telecommunications Industry Solutions*, 2005, 17 pages.
"Report on Location Service feature (LCS) 25.923 v1.0.0," TSG-RAN Working Group 2 (Radio layer 2 and Radio layer 3), Berlin, May 25-28, 1999, 45 pages.
"Review Guide—Google Maps for mobile (beta)," Google, 2006, 7 pages.
"Revised CR to 09/31 on work item LCS," ETSI SMG3 Plenary Meeting #6, Nice, France, Dec. 13-15, 1999. 18 pages.
"School Buses to Carry Noticom's First Application," Internet: URL: http://findarticles.com/p/articles/mi_m0BMD/is_1999_Feb_17/ai_n27547754/ downloaded from the Internet on Feb. 17, 1999, 2 pages.
"Travel Time Data Collection Handbook—Chapter 5: ITS Probe Vehicle Techniques," FHWA-PL-98-035 Report, Department of Transport, University of Texas, Mar. 1998; [online] [Retrieved from the Internet at http://www.fhwa.dot.gov/ohim/handbook/chap5.pdf, 70 pages.
"User-centered design of mobile solutions," NAMAHN, 2006, 18 pages.
"Windows Live Search for Mobile Goes Final, Still Great," [online] [Retrieved on Mar. 11, 2007]; Retrieved from the Internet URL: http://gizmodo.com/gadgets/software/windows-live-search-for-mobile-goes-final-still-great-236002.php; 3 pages.
"Windows Mobile 6 Professional Video Tour," [online] [Retrieved on Mar. 11, 2007]; Retrieved from the Internet URL: http://gizmodo.com/gadgets/cellphones/windows-mobile-6-professional-video-tour-237039.php; 4 pages.
"Windows Mobile," Microsoft, 2007, 2 pages.
Abowd et al., "Context-awareness in wearable and ubiquitous computing," *1st International Symposium on Wearable Computers*, Oct. 13-14, 1997, Cambridge, MA, 9 pages.
Abowd et al., "Cyberguide: A mobile context-aware tour guide," *Wireless Networks*, 1997, 3(5):421-433.
Akerblom, "Tracking Mobile Phones in Urban Areas," Goteborg University Thesis, Sep. 2000, 67 pages.
Anand et al., "A Quantitative Analysis of Power Consumption for Location-Aware Applications on Smart Phones," *IEEE International Symposium on Industrial Electronics*, Jun. 4-7, 2007, pp. 1986-1991.
Authorized officer Cristina Novelli, International Search Report/Written Opinion in PCT/US2009/041298 mailed Oct. 1, 2009, 15 pages.
Authorized officer E Pascual Vallés, International Search Report/Written Opinion in Application No. PCT/US2007/088880 mailed Jun. 16, 2008, 5 pages.

(56) References Cited

OTHER PUBLICATIONS

Authorized officer Matthew Davies, Invitation to Pay Additional Fees and, Where Applicable, Protest Fee, PCT/US2008/050295 mailed Jul. 29, 2008, 10 pages.
Ayatsuka et al., "UbiquitousLinks: Hypermedia Links Embedded in the Real World, Technical Report of Information Processing Society, 96-HI-67," Information Processing Society of Japan, Jul. 11, 1996, 96(62):23-30.
Balliet, "Transportation Information Distribution System," *IBM Technical Disclosure Bulletin*, [online] [Retrieved on Nov. 7, 2008]; Retrieved from the Internet URL: https://www.delphion.com/tdbs/tdb?order=86A+61395; Jun. 1986; 2 pages.
Balsiger et al., "MOGID: Mobile Geo-depended Information on Demand," *Workshop on Position Dependent Information Services (W3C-WAP)*, 2000, 8 pages.
Beard and Palancioglu, "Estimating Positions and Paths of Moving Objects," *IEEE*, 2000, pp. 1-8.
Bederson, "Audio Augmented Reality: A Prototype Automated Tour Guide," *CHI '95 Mosaic of Creativity*, May 7-11, 1995, Chicago, IL, pp. 210-211.
Beeharee and Steed, "Minimising Pedestrian Navigational Ambiguities Through Geoannotation and Temporal Tagging," *Human-Computer Interaction, Interaction Platforms and Techniques*, Springer, 2007, pp. 748-757.
Beeharee and Steed, "Natural Wayfinding—Exploiting Photos in Pedestrian Navigation Systems," *Mobile HCI*, Sep. 12, 2006, pp. 81-88.
Benefon ESC! GSM+GPS Personal Navigation Phone, benefon.com, Copyright 2001, 4 pages.
Berman and Powell, "The Role of Dead Reckoning and Inertial Sensors in Future General Aviation Navigation," *IEEE*, 1998, pp. 510-517.
Bevly and Parkinson, "Cascaded Kalman Filters for Accurate Estimation of Multiple Biases, Dead-Reckoning Navigation, and Full State Feedback Control of Ground Vehicles," *IEEE Transactions on Control Systems in Technology*, 2007, 15(2):199-208.
Binzhuo and Bin, "Mobile Phone GIS Based on Mobile SVG," *IEEE*, 2005, pp. 889-892.
Bokharouss et al., "A Location-Aware Mobile Call Handling Assistant," *21st International Conference on Advanced Information Networking and Applications Workshops*, 2007, 8 pages.
Bonsignore, "A Comparative Evaluation of the Benefits of Advanced Traveler Information System (ATIS) Operational Tests," MIT Masters Thesis, Feb. 1994, 140 pps.
Boonsrimuang et al., "Mobile Internet Navigation System," *IEEE*, 2002, pp. 325-328.
Borsodi, "Super Resolution of Discrete Arrivals in a Cellular Geolocation System," University of Calgary Thesis, Apr. 2000, 164 pages.
Brown, "The stick-e document: a framework for creating context-aware applications," *Electronic Publishing*, 1995, 8:259-272.
Brown, "Triggering Information by Context," *Personal Technologies*, 1998, 2:18-27.
Budka et al., "A Bayesian Method to Improve Mobile Geolocation Accuracy," IEEE 56th Vehicular Technology Conference Proceedings, Sep. 24-28, 2002, Vancouver, CA, 2:1021-1025.
Burnett, "Usable Vehicle Navigation Systems: Are We There Yet?" *Vehicle Electronic Systems 2000*, Jun. 29-30, 2000, 3.1.1-3.1.12.
Camp and DeHayes, Jr., "A computer-based method for predicting transit time parameters using grid systems," *Decision Sciences*, 1974, 5:339-346.
Carew, "Phones that tell you where to drive, meet, eat," [online] [Retrieved May 26, 2007]; Retrieved from the Internet URL http://news.yahoo.com/s/nm/20070525/wr_nm/column_pluggedin_dc_2&printer=1;_ylt=Ahqaftn7xmlS2r0FZFeu9G4ht.cA; 2 pages.
Challe, "CARMINAT—An Integrated information and guidance system," *Vehicle Navigation and Information Systems Conference*, Oct. 20-23, 1991, Renault—Direction de la Recherche, Rueil-Malmaison, France.
Change Request for "U.S. specific Emergency Services requirements included as an informative annex," Nov. 29, 1999, 2 pages.
Charny, "AT&T puts 411 to the text," [online] [Retrieved Mar. 4, 2009]; Retrieved from the Internet URL http://news.cnet.com/ATT-puts-411-to-the-text/2100-1039_3-1000669.html; May 8, 2003; 2 pages.
Cheverst et al., "Architectural Ideas for the Support of Adaptive Context-Aware Applications," *Proceedings of Workshop on Infrastructure for Smart Devices—How to Make Ubiquity an Actuality, HUC'00*, Bristol, Sep. 2000, 3 pages.
Cheverst et al., "Design of an Object Model for a Context Sensitive Tourist Guide," *Computers and Graphics*, 1999, 23(6):883-891.
Cheverst et al., "Developing Interfaces for Collaborative Mobile Systems," 1999, 15 pages.
Cheverst et al., "Experiences of Developing and Deploying a Context-Aware Tourist Guide: The GUIDE Project," 2000, pp. 20-31.
Cheverst et al., "Exploiting Context to Support Social Awareness and Social Navigation," *SIGGROUP Bulleting* Dec. 2000, 21(3):43-48.
Cheverst et al., "Services to Support Consistency in Mobile Collaborative Applications," *Proc. 3rd International Workshop on Services in Distributed Networked Environments*, 1996, 8 pages.
Cheverst et al., "Sharing (Location) Context to Facilitate Collaboration Between City Visitors," 2000, 8 pages.
Cheverst et al., "Supporting Collaboration in Mobile-aware Groupware," *Workshop on Handheld CSCW*, 1998, 6 pages.
Cheverst et al., "The Role of Connectivity in Supporting Context-Sensitive Applications," *HUC'99, LNCS 1707*, 1999, pp. 193-209.
Cheverst et al., "The Support of Mobile-Awareness in Collaborative Groupware," *Personal Technologies*, 1999, 3:33-42.
Cho et al., "A Traveler Information Service Structure in Hybrid T-DMB and Cellular Communication Network," *IEEE*, 2006, pp. 747-750.
Christie et al., "Development and Deployment of GPS wireless devices for E911 and Location based services," Position, location and Navigation Symposium, Palm Springs, CA, Apr. 15-18, 2002, pp. 60-65w.
Chua et al., "Intelligent Portal for Event-triggered SMS Alerts," *2nd International Conference on Mobile Technology, Applications and Systems*, 2005, 7 pages.
Civilis et al., "Efficient Tracking of Moving Objects with Precision Guarantees," *Proc. First Annual International Conference on Mobile and Ubiquitous Systems: Networking and Services (MobiQuitous '04)*, 2004, 10 pages.
Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.
Costa et al., "Experiments with Reflective Middleware," *Proceedings of the ECOOP'98 Workshop on Reflective Object-Oriented Programming and Systems, ECOOP'98 Workshop Reader*, 1998, 13 pages.
Dalrymple, "Google Maps adds locator, but not for iPhone," [online] [Retrieved Nov. 30, 2007]; Retrieved from the Internet URL: http://news.yahoo.com/s/macworld/20071130/tc_macworld/googlemaps20071130_0&printer=1;_ylt=Auvf3s6LQK_pOaJlb954T_DQn6gB; 1 page.
Davies et al., "'Caches in the Air': Disseminating Tourist Information in the Guide System," *Second IEEE Workshop on Mobile Computer Systems and Applications*, Feb. 25-26, 1999, 9 pages.
Davies et al., "L2imbo: A distributed systems plastform for mobile computing," *Mobile Networks and Applications*, 1998, 3:143-156.
Dey et al., "CyberDesk: a framework for providing self-integrating context-aware services," *Knowledge-Based Systems*, 1998, 11:3-13.
Dey, "Context-Aware Computing: The CyberDesk Project," [online] Retrieved from the Internet: URL: http://www.cc.gatech.edu/fce/cyberdesk/pubs/AAAI98/AAAI98.html;*AAAI '98 Spring Symposium*,, Stanford University, Mar. 23-25, 1998, downloaded from the Internet on Aug. 6, 2010, 8 pages.
Dibdin, "Where are mobile location based services?" *CM316 Multimedia Systems Paper*, Dec. 14, 2001, 8 pages.

(56) References Cited

OTHER PUBLICATIONS

Dix et al., "Exploiting Space and Location as a Design Framework for Interactive Mobile Systems," *ACM Transactions on Computer-Human Interaction (TOCHI)—Special issue on human-computer interaction with mobile systems*, 2000, 7(3):285-321.
Dommety and Jain, "Potential Networking Applications of Global Positioning Systems (GPS)," [online] [Retrieved on Nov. 18, 2008]; [Retrieved from the Internet URL: http://arxiv.org/ftp/cs/papers/9809/9809079.pdf; OSU Technical Report TR-24, Apr. 1996, 41 pages.
Drane and Rizos, "Role of Positioning Systems in ITS," *Positioning Systems in Intelligent Transportation Systems*, Dec. 1997, pp. 312, 346-349.
Drane et al., "Positioning GSM Telephones," *IEEE Communications Magazine*, Apr. 1998, pp. 46-59.
Drane et al., "The Accurate Location of Mobile Telephones," *Third Annual World Congress on Intelligent Transport Systems*, Orlando, Florida, Oct. 1996, 8 pages.
Dunn and Toohey, "Wireless Emergency Call System," *IBM Technical Disclosure Bulletin*, Sep. 1994; 1 page.
Ebine, "Dual frequency resonant base station antennas for PDC systems in Japan," *IEEE*, 1999, pp. 564-567.
Efstratiou and Cheverst, "Reflection: A Solution for Highly Adaptive Mobile Systems," *2000 Workshop on Reflective Middleware*, 2000, 2 pages.
Efstratiou et al., "Architectural Requirements for the Effective Support of Adaptive Mobile Applications," 2000, 12 pages.
Evans et al., "In-Vehicle Man-Machine Interaction. The Socrates Approach," *Vehicle Navigation & Information System Conference Proceedings*, 1994, Aug. 31-Sep. 2, 1994, pp. 473-477.
International Preliminary Report on Patentability in PCT/US2009/055065 mailed Mar. 31, 2011, 8 pages.
Feddema et al., "Cooperative Sentry Vehicles and Differential GPS Leapfrog," 2000, *United States Department of Energy*, pp. 1-12.
Fischer et al., "System Performance Evaluation of Mobile Positioning Methods," *IEEE*, Aug. 2002, pp. 1962-1966.
Flinn and Satyanarayanan, "PowerScope: A Tool for Profiling the Energy Usage of Mobile Applications," *Proc. WMCSA '99 Second IEEE Workshop on Mobile Computing Systems and Applications*, Feb. 25-26, 1999, 9 pages.
French and Driscoll, "Location Technologies for ITS Emergency Notification and E911," *Proc. 1996 National Technical Meeting of The Institute of Navigation*, Jan. 22-24, 1996, pp. 355-359.
Freundschuh, "Does 'Anybody' Really Want (or Need) Vehicle Navigation Aids?" *First Vehicle Navigation and Information System Conference*, Sep. 11-13, 1989, Toronto, Canada, 5 pages.
Friday et al., "Developing Adaptive Applications: The MOST Experience," *J. Integrated Computer-Aided Engineering*, 1999, pp. 143-157.
Gould, "The Provision of Usable Navigation Assistance: Considering Individual Cognitive Ability," *First Vehicle Navigation and Information System Conference*, Sep. 11-13, 1989, Toronto, Canada, 7 pages.
Green et al., "Suggested Human Factors Design Guidelines for Driver Information Systems," *Technical Report UMTRI-93-21*, Nov. 1993, 119 pages.
Gunnarsson et al., "Location Trial System for Mobile Phones," *IEEE*, 1998, pp. 2211-2216.
Guo et al., "An Intelligent Query System Based on Chinese Short Message Service for Restaurant Recommendation," *Sixth International Conference on the Management of Mobile Business (ICMB 2007)*, 2007, 1 page.
Hameed and Shabnam, "An Intelligent Agent-Based Medication and Emergency System," *IEEE*, 2006, pp. 3326-3330.
Helal et al., "Drishti: An Integrated Navigation System for Visually Impaired and Disabled," *Fifth International Symposium on Wearable Computers (ISWC'01)*, 2001, pp. 149-156.
Hodes and Katz, "Composable ad hoc location-based services for heterogeneous mobile clients," *Wireless Networks*, 1999, 5:411-427.
Hohman et al., "GPS Roadside Integrated Precision Positioning System," *Position Location and Navigation Symposium*, 2000, pp. 221-230.
Hoogenraad, "Location Dependent Services," *3rd AGILE Conference on Geographic Information Science*, Helsinki/Espoo, Finland, May 25-27, 2000, pp. 74-77.
Jirawimut et al., "A Method for Dead Reckoning Parameter Correction in Pedestrian Navigation System," *IEEE Transactions on Instrumentation and Measurement*, 2003, 52(1):209-215.
Jose and Davies, "Scalabe and Flexible Location-Based Services for Ubiquitous Information Access," *HUC'99, LNCS 1707*, 1999, pp. 52-66.
Ju et al., "RFID Data Collection and Integration Based on Mobile Agent," *IEEE*, 2006, 4 pages.
Kbar and Mansoor, "Mobile Station Location based on Hybrid of Signal Strength and Time of Arrival," *Proc. International Conference on Mobile Business (ICMB'05)*, 2005, 7 pages.
Khattak et al., "Bay Area ATIS Testbed Plan," Research Reports, California Partners for Advanced Transit and Highways (PATH), Institute of Transportation Studies, UC Berkeley, Jan. 1, 1992, 83 pages.
Klinec and Nolz, "Nexus-Positioning and Communication Environment for Spatially Aware Applications," *IAPRS*, Amsterdam, 2000, 7 pages.
Koide and Kato, "3-D Human Navigation System with Consideration of Neighboring Space Information," *2006 IEEE International Conference on Systems, Man and Cybernetics*, Oct. 8-11, 2006, Taipei, Taiwan, pp. 1693-1698.
Kovacs et al., "Adaptive Mobile Access to Context-aware Services," *Proc. ASAMA '99 Proc. First International Symposium on Agent Systems and Applications Third International Symposium on Mobile Agents*, IEEE Computer Society Washington, DC, 1999, 12 pages.
Kreller et al., "A Mobile-Aware City Guide Application," *ACTS Mobile Communication Summit*, 1998, Rhodes, Greece, 7 pages.
Kreller et al., "UMTS: A Middleware Architecture and Mobile API/Approach," *IEEE Personal Communications*, Apr. 1998, pp. 32-38.
Kugler and Lechner, "Combined Use of GPS and LORAN-C in Integrated Navigation Systems," *Fifth International Conference on Satellite Systems for Mobile Communications and Navigation*, London, UK, May 13-15, 1996, pp. 199-207.
Kyriazakos et al., "Optimization of the Handover Algorithm based on the Position of the Mobile Terminals," Communications and Vehicular Technology, Oct. 2000, pp. 155-159.
Leonhardt and Magee, "Multi-Sensor Location Tracking," *MOBICOM 98*, Dallas, TX, pp. 203-214.
Leonhardt and Magee, "Towards a general location service for mobile environments," *Proc. Third International Workshop on Services in Distributed and Networked Environments*, Jun. 3-4, 1996, 8 pages.
Lloyd and Tianlin, "Cellular phone base stations installation violate the Electromagnetic Compatibility regulations," *2004 4th International Conference on Microwave and Millimeter Wave Technology Proceedings*, 2004, pp. 920-922.
Long et al., "Rapid Prototyping of Mobile Context-Aware Applications: The Cyberguide Case Study," *MobiCom '96*, 1996, 11 pages.
Lusky et al., "Mapping the Present," *ColoradoBiz*, Nov. 1999, 26(11):16-17.
Maaβ, "Location-Aware Mobile Applications based on Directory Services," *MOBICOM 97*, 1997, Budapest, Hungary, pp. 23-33.
Mahmassani et al., "Providing Advanced and Real-Time Travel/Traffic Information to Tourists," *Center for Transportation Research, Bureau of Engineering Research, The University of Texas at Austin*, Oct. 1998, 15 pages.
Manabe et al., "On the M-CubITS Pedestrian Navigation System," *Proc. IEEE Intelligent Transportation Systems Conference*, Toronto, Canada, Sep. 17-20, 2006, pp. 793-798.
Mark, "A Conceptual Model for Vehicle Navigation Systems," *First Vehicle Navigation and Information System Conference*, Sep. 11-13, 1989, Toronto, Canada 11 pages.

(56) References Cited

OTHER PUBLICATIONS

Maxwell et al., "Alfred: The Robot Waiter Who Remembers You," *AAAI Technical Report WS-99-15*, 1999, 12 pages.
McCarthy and Meidel, "ACTIVEMAP: A Visualization Tool for Location Awareness to Support Informal Interactions," *HUC '99, LNCS 1707*, 1999, pp. 158-170.
Meier and Cahill, "Location-Aware Event-Based Middleware: A Paradigm for Collaborative Mobile Applications?" *8th CaberNet Radicals Workshop*, 2003, 5 pages.
Microsoft Outlook 2003 User's Guide, http://opan.admin.ufl.edu/user_guides/outlook2003.htm. Aug. 2004, 17 pages.
Miller et al., "Integrating Hierarchical Navigation and Querying: A User Customizable Solution," *ACM Multimedia Workshop on Effective Abstractions in Multimedia Layout, Presentation, and Interaction*, San Francisco, CA, Nov. 1995, 8 pages.
Miller et al., "Synchronization of Mobile XML Databases by Utilizing Deferred Views," *IEEE*, 2004, pp. 186-191.
Mio Technology "User's Manual MioMap 2.0," Mio DigiWalker, 2005, 59 pages.
Mio Technology: "27 Countries in your pocket," [online] [Retrieved on Jul. 9, 2008]; Retrieved from the Internet URL: http://www.miotech.be/en/printview/press-releases-2005-09-29.htm>; 1 page.
Mio Technology: "Mio 269+ User's Manual," [online] [Retrieved on Jul. 9, 2008]; Retrieved from the Internet URL: http://www.miotech.be/Manuals/269+/Device-Manual/268-plus-269-plus-Device-Manual-EN.pdf> Mio DigiWalker, Aug. 2005, 44 pages.
Muraskin, "Two-Minute Warnings for School Bus Riders," Internet: URL: http://www.callcentermagazine.com/shared/printableArticle.jhtml;jsessionid=PQH1SZXW . . . Jul. 1, 1999, 3 pages.
Nagao et al., Walk Navi: A Location-Aware Interactive Navigation/Guideline System and Software III, First edition, pp. 9-48, published by Kindai-Kagaku-Sya Co. Ltd., Dec. 10, 1995.
Nardi et al., "Integrating Communication and Information Through Contact Map," *Communications of the ACM*, 2002, 45(4):89-95.
Ni and Deakin, "On-Board Advanced Traveler Information Systems," Dec. 1, 2002, 10 pages.
Noonan and Shearer, "Intelligent Transportation Systems Field Operational Test Cross-Cutting Study Advance Traveler Information systems," *Intelligent Transportation Systems Field Operational Test Cross-Cutting Study*, Sep. 1998, 26 pages.
Northard, "Docking Station Communication Link," *IBM Technical Disclosure Bulletin*, 1994, 4 pages.
O'Grady et al., "A Tourist-Centric Mechanism for Interacting with the Environment," Proceedings of the First International Workshop on Managing Interactions in Smart Environments (MANSE '99), *Dublin, Ireland*, Dec. 1999, pp. 56-67.
Oh et al., "Spatial Applications Using 4S Technology for Mobile Environment," *IEEE*, 2002, 3 pages.
Paksoy et al., "The Global Position System-Navigation Tool of the Future," *J Electrical & Electronics*, 2002, 2(1):467-476.
Parikh, "Tele Locate," *IBM Technical Disclosure Bulletin*, [online] [Retrieved on Nov. 7, 2008]; Retrieved from the Internet URL: https://www.delphion.com/tdbs/tdb?order=92A+62775; 1992, 1 page.
Pascoe et al., "Developing Personal Technology for the Field," *Personal Technologies*, 1998, 2:28-36.
Pfoser et al., "Dynamic Travel Time Maps—Enabling Efficient Navigation," *Proc. 18th International Conference on Scientific and Statistical Database Management (SSDBM'06)*, 2006, 10 pages.
Popescu-Zeletin et al., "Applying Location-Aware Computing for Electronic Commerce: Mobile Guide," *Proc. 5th Conference on Computer Communications*, AFRICOM-CCDC'98, Oct. 20-22, 1998, 14 pages.
Portfolio 2007; [online] [Retrieved on Jun. 14, 2007]; Retrieved from the Internet URL: http://eric.wahlforss.com/folio; 3 pages.
Pungel, "Traffic control-beat the jam electronically," *Funkschau*, 1988, 18:43-45 (w/English translation).
RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.
Rekimoto et al., "Augment-able Reality: Situated Communication through Physical and Digital Spaces," *Second International Symposium on Wearable Computers (ISWC'98)*, 1998, pp. 1-8.
Rillings and Betsold, "Advanced driver information systems," *Vehicular Technology*, IEEE Vehicular Technology Society, 1991, 40:31-40.
Rogers et al., "Adaptive User Interfaces for Automotive Environments," *Proc. IEEE Intelligent Vehicles Symposium 2000*, Oct. 3-5, 2000, Dearborn, MI, pp. 662-667.
Rozier et al. "Hear&There: An Augmented Reality System of Linked Audio,"*Proceedings of the International Conference on Auditory Display*, Atlanta, GA, Apr. 2000, pp. 1-5.
Samadani et al., "PathMarker: systems for capturing trips," *2004 IEEE International Conference on Multimedia and Expo (ICME)*, Jun. 27-30, 2004, 3:2123-2126.
Schreiner, "Where We At? Mobile Phones Bring GPS to the Masses," *IEEE Computer Society*, May/Jun. 2007, pp. 6-11.
Serafin et al., "Functions and Features of Future Driver Information Systems," *Technical Report UMTRI-91-16*, May 1991, 104 pages.
Shekhar and Liu, "Genesis and Advanced Traveler Information Systems (ATIS): Killer Applications for Mobile Computing?" *NSF Mobidata Workshop on Mobile and Wireless Information Systems*, Nov. 1994, 20 pages.
Shibata et al., "Development and Integration of Generic Components for a Teachable Vision-Based Mobile Robot," *IEEE/ASME Transactions on Mechatronics*, 1996, 1(3):230-236.
Spohrer, "New Paradigms for Using Computers (Abstract)," 1997; [online]; Retrieved from the Internet URL: http://www.almaden.ibm.com/almaden/npuc97/1997/spohrer.htm; 1 page.
Sung et al., "Towards Reliable Peer-to-Peer Data Sharing over Mobile Ad hoc Networks," *IEEE*, 2005, 5 pages.
Tarumi et al., "Public Applications of SpaceTag and Their Impacts," *Digital Cities, LNCS* 1765, 2000, pp. 350-363.
Tebbutt, "Dial your way out of the woods," *The Australian*, Feb. 2000, 1 page.
Tijerina et al., "Driver Workload Assessment of Route Guidance System Destination Entry While Driving: A Test Track Study," *Proceedings of the 5th ITS World Congress*, Oct. 12-16, 1998, Seoul, Korea, 9 pages.
Tso et al., "Always on, Always Connected Mobile Computing," Mobile Communications Operation—Mobile Handheld Products Group, 1996, pp. 918-924.
Tsuzawa and Okamoto, "Advanced Mobile Traffic Information and Communication System," *First Vehicle Navigation and Information Systems Conference*, Sep. 11-13, 1989, Toronto, Canada, Abstract only.
Wang and Huang, "An Unified Vehicle Supervising and Traffic Information System," *IEEE*, 1996, pp. 968-972.
Wang and Lin, "Location Aware Information Agent over WAP," *Tamkang Journal of Science and Engineering*, 2000, 3(2):107-115.
Weinberg, "Using the ADXL202 in Pedometer and Personal Navigation Applications," AN-602, Analog Devices, Jul. 2002, 8 pages.
Weiβ et al., "Zone Services—An Approach for Location-based Data Collection," *Proceedings of the 8th IEEE International Conference on E-Commerce Technology and the 3rd IEEE International Conference on Enterprise Computing, E-Commerce and E-Services (CEC/EEE'06)*, 2006, 8 pages.
Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pps.
Wong, "GPS: making roads safer and solving traffic tangles," *Asia Engineer*, 1995, 23(9):31-32.
Wu et al., "A Multimedia System for Route Sharing and Video-Based Navigation," *IEEE*, 2006, pp. 73-76.
Yamamoto et al., "Position Location Technologies Using Signal Strength in Cellular Systems," *IEEE 53rd Vehicular Technology Conference*, May 6-9, 2001, Rhodes, Greece, 53:2570-2574.

(56) References Cited

OTHER PUBLICATIONS

Yang and Marsland, "Global Snapshots for Distributed Debugging," *IEEE*, 1992, pp. 436-440.
Yanyan et al., "The Model of Optimum Route Selection in Vehicle Automatic Navigation System Based on Unblocked Reliability Analyses," *IEEE*, 2003, pp. 975-978.
Ygnace et al., "Travel Time Estimation on the San Francisco Bay Area Network Using Cellular Phones as Probes," Working Paper, Institute of Transportation Studies, University of California, Berkeley, 2000, 58 pages.
Yim et al., "Travinfo Field Operational Test: Work Plan for the Target, Network, and Value Added Reseller (VAR) Customer Studies," *Working Papers, California Partners for Advanced Transit and Highways (PATH), Institute of Transportation Studies, UC Berkeley*, Apr. 1, 1997, 49 pages.
Yogesh C. Rathod, Third Party Submission in U.S. Appl. No. 12/233,358 mailed Mar. 30, 2010, 12 pages.
Yokote, "The Apertos Reflective Operating System: The Concept and Its Implementation," *OOPSLA'92*, pp. 414-434.
Zhao, "Mobile Phone Location Determination and Its Impact on Intelligent Transportation Systems," *IEEE Transactions on Intelligent Transportation Systems*, Mar. 2000, 1(1):55-64.
Zubac and Strahonja, "Theory and Development of an Online Navigation System," 18th International Conference on Information and Intelligent Systems, University of Zagreb, Sep. 12-14, 2007.

\* cited by examiner

DISFAVORED ROUTE PROGRESSIONS OR LOCATIONS

CROSS-REFERENCE TO RELATED APPLICATION

This application is a continuation (and claims the benefit of priority under 35 USC 120) of U.S. application Ser. No. 12/020,168, filed Jan. 25, 2008, now U.S. Pat. No. 8,385,946, issued Feb. 26, 2013, which claims the benefit of U.S. Provisional Patent Application Ser. No. 60/946,837 filed Jun. 28, 2007, and entitled "DISFAVORED ROUTE PROGRESSIONS OR LOCATIONS". The disclosures of the prior applications are considered part of (and are incorporated by reference in) the disclosure of this application.

BACKGROUND

This disclosure relates to navigation using a mobile device.

Navigation systems have begun to include functionality for inclusion of traffic data overlaying a navigation interface. Such navigation systems, however, provide little intelligence other than the ability to navigate from an origination point to a destination point. Because a user often has some intelligence about routes to a location, in many instances the user ignores navigation routes provided by the navigation system in favor of the routes the user knows. Additionally, current navigation systems do not readily facilitate navigation to a destination if a user desires to travel a different route while enroute on the route recommended by the navigation system.

SUMMARY

In one aspect, systems, methods, apparatuses and computer program products are provided. In one aspect, methods are disclosed, which comprise: receiving a preference comprising disfavored route progressions or disfavored locations associated with a user; identifying destination information associated with a user; identifying one or more potential routes comprising a plurality of route progressions based on a current location and the destination information; analyzing the plurality of route progressions associated with the one or more potential routes based on the disfavored route progressions or disfavored locations associated with the user; and presenting one or more routes to the user based on the analysis.

Systems can include a preference engine, a destination engine, a routing engine, an analysis engine, and a presentation engine. The preference engine can receive disfavored route progressions or disfavored locations associated with a user. The routing engine can identify routes, each route including a plurality of route progressions. The identification of the routes can be based on a current location and the destination information. The analysis engine can analyze the plurality of route progressions associated with the potential routes based upon the disfavored route progressions or disfavored locations. The presentation engine can present preferred routes to the user, the preferred routes being based on results from the analysis engine Systems and methods as described can facilitate navigation of roads by directing a user to use routes that do not include disfavored route progressions or locations associated with the user.

DETAILED DESCRIPTION

Figure 1:
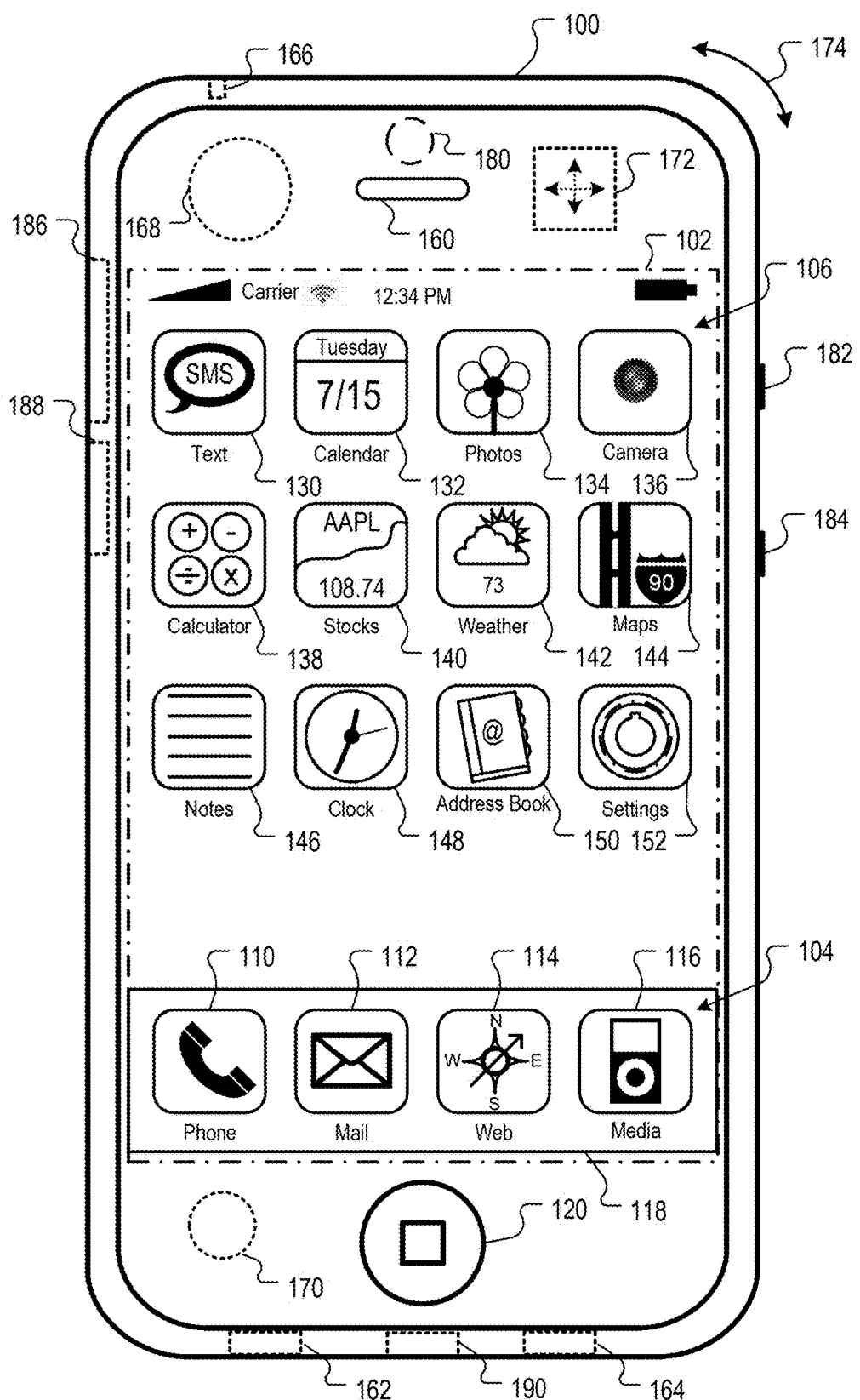
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other device or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116 can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 130, 132, 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used.

Network Operating Environment

Figure 2:
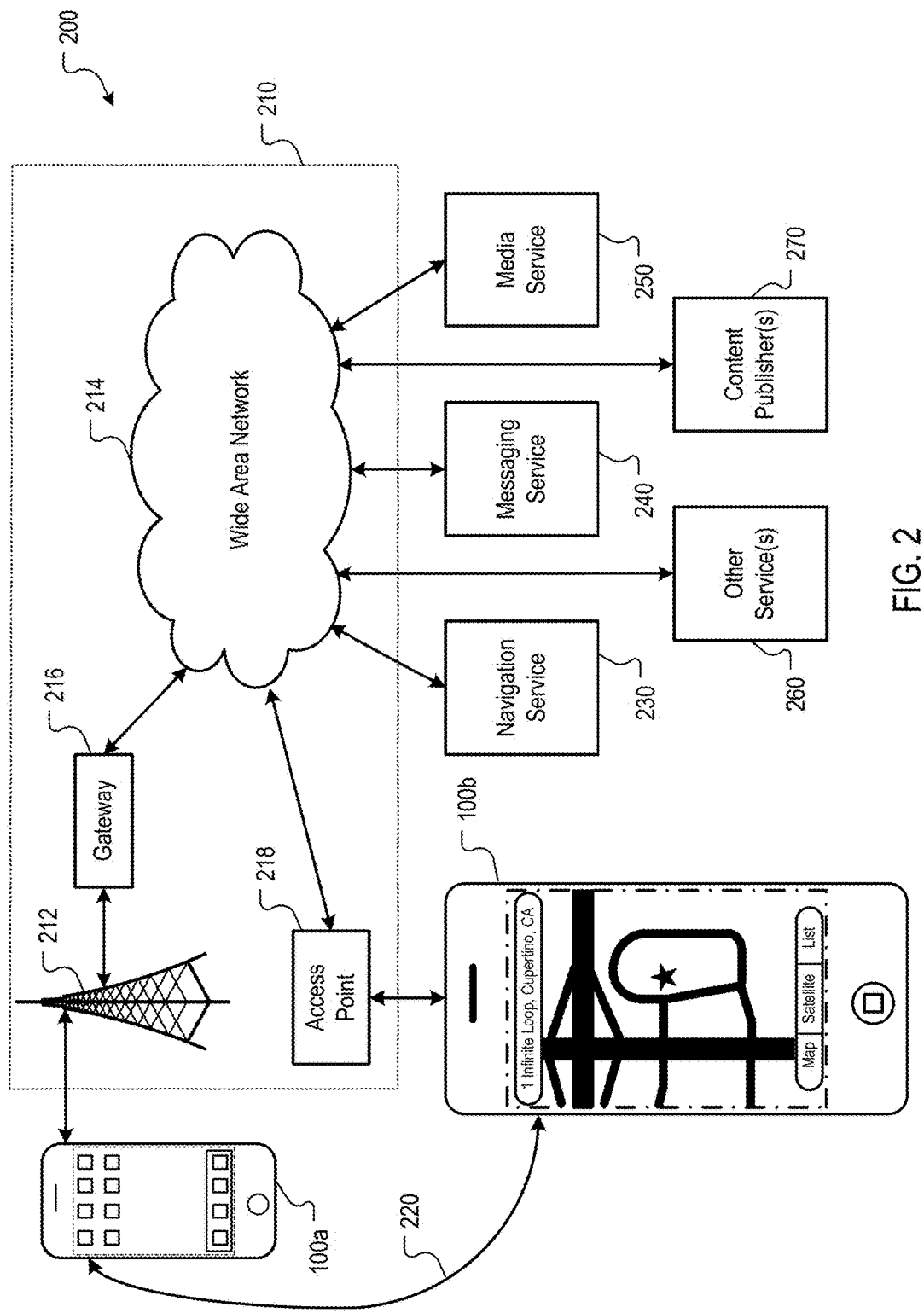
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access point device, can provide communication access to the wide area network 214. In some implementations, both voice and data communications can be established over the wireless network 212 and the access point 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access point 218 and the wide area network 214. In some implementations, the mobile device 100 can be physically connected to the access point 218 using one or more cables and the access point 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, and 260 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. One or more other services 260 can also be utilized by the mobile device 100.

The mobile device 100 can also access other data and content over the one or more wired and/or wireless networks 210. For example, content publishers 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

Example Mobile Device Architecture

Figure 3:
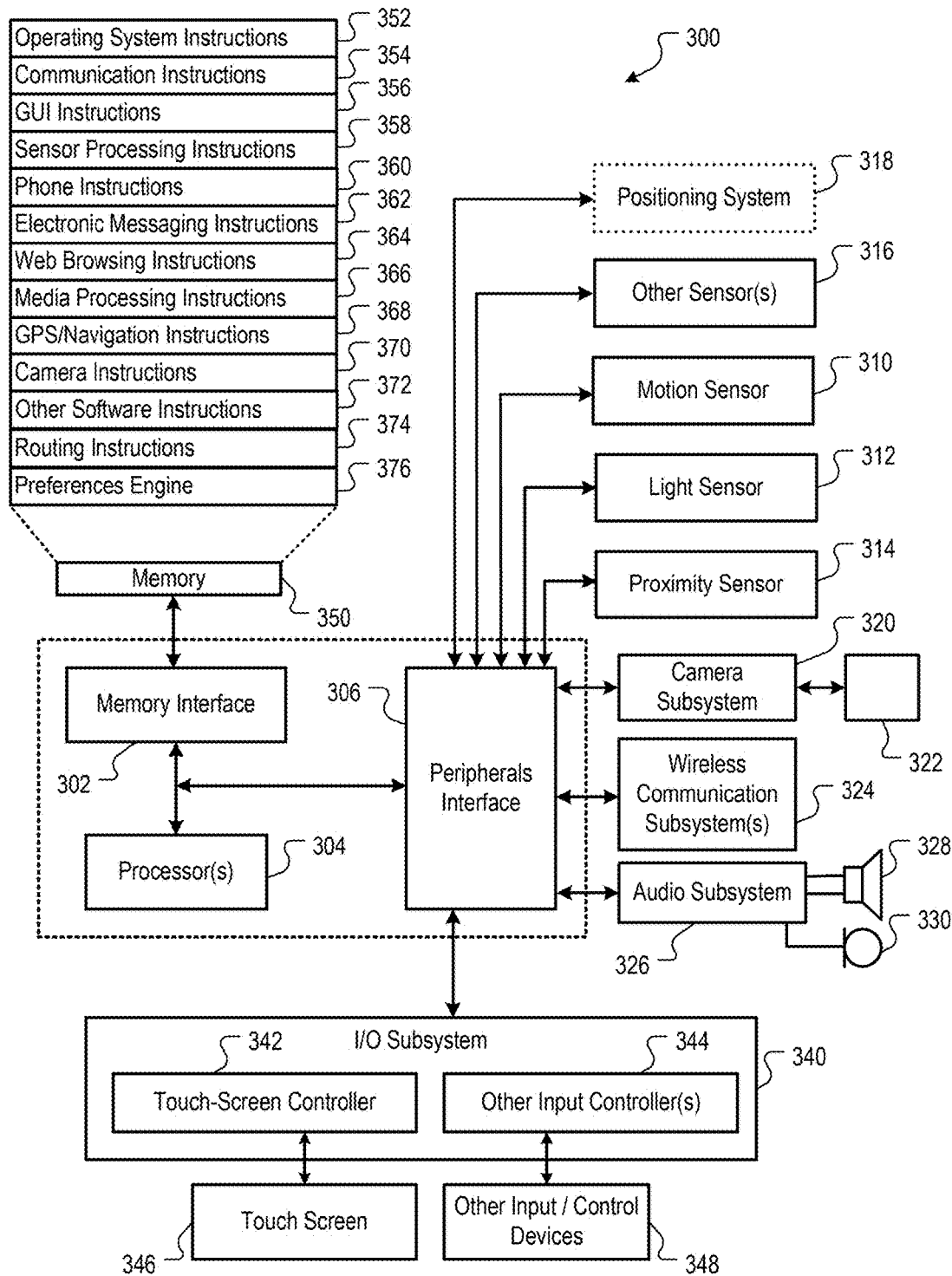
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

In some implementations, the mobile device can receive positioning information from a positioning system 318. The positioning system 318, in various implementations, can be located on the mobile device, or can be coupled to the mobile device (e.g., using a wired connection or a wireless connection). In some implementations, the positioning system 318 can include a global positioning system (GPS) receiver and a positioning engine operable to derive positioning information from received GPS satellite signals. In other implementations, the positioning system 318 can include a compass and an accelerometer, as well as a positioning engine operable to derive positioning information based on dead reckoning techniques. In still further implementations, the positioning system 318 can use wireless signals (e.g., cellular signals, IEEE 802.11 signals, etc) to determine location information associated with the mobile device, such as those provided by Skyhook Wireless, Inc. of Boston, Mass. Hybrid positioning systems using a combination of satellite and television signals, such as those provided by Rosum Corporation of Mountain View, Calif., can also be used. Other positioning systems are possible.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions.

In some implementations, the mobile device can also include routing instructions 374. The routing instructions 374 can be used to provide navigation guidance to a user of the mobile device. In such implementations, the routing instructions 374 can provide intelligent routing based on disfavored routes/locations, traffic, user preferences, and/or history.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Figure 4A:
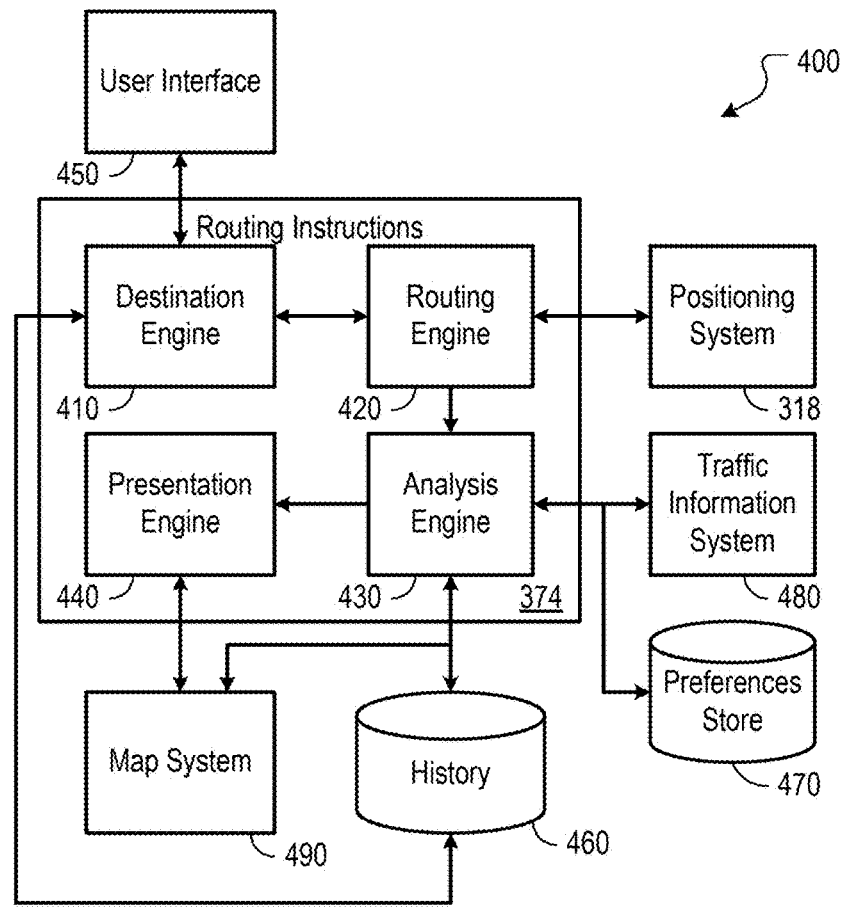
FIG. 4A is a block diagram illustrating an example implementation of routing instructions.

FIG. 4A is a block diagram illustrating an example implementation of a routing system (e.g., embodied in routing instructions stored in a memory). The system 400 can, for example receive multiple preferences including disfavored route progressions and/or locations from a user of a mobile device and arbitrate between competing preferences to provide the user with a route based on the preferences provided by the user.

In some implementations, the routing instructions, when executed, can implement a destination engine 410, a routing engine 420, an analysis engine 430 and a presentation engine 440. In an implementation, the destination engine 410 can receive destination information from a user interface 450. In various implementations, the user interface can include a graphical user interface such as could be provided by the GUI instructions and touch screen of FIG. 3.

In other implementations, the destination engine 410 can derive destination information based on historical data retrieved, for example, from a historical data store 460. The destination engine 410 can parse the historical data to derive navigation habits. For example, a user might drive to work every day. Thus, the destination engine 410 can determine that there is a probability that a destination associated with the user is a workplace. In other implementations, the destination engine 410 can use other algorithms to derive a destination, such as a Markov chain based algorithm. In various examples, the derived destination can include multiple destinations. In such examples, the destinations can include one or more waypoints along with a final destination. In other examples, the derived destination can also take into account a parking situation associated with a destination. Thus, if a user is headed for a stadium for a sporting event, the destination engine 410 can determine that while the stadium is the ultimate destination, the user might be directed to a parking lot as a waypoint to park his/her car before going to the stadium.

In some implementations, the destination engine 410 utilizes date information, time information, calendar information, history information, preference information, etc. to derive destination information. Date information can include, for example, the day of the week, holiday information, etc. For example, a user might have a history of navigating to/from work on Monday through Friday, navigating to/from a grocery store on Sundays, navigating to a parent's house on Mother's Day or Father's Day, etc.

In some implementations, the destination engine 410 can also use the time information such as, e.g., the time of day to derive a destination. For example, on Monday morning, it is likely that a user is navigating to work, on Wednesday night it is likely that the user is navigating to a softball field for a regularly scheduled game, etc.

In some implementations, the destination engine 410 can use calendar information such as appointments, tasks, etc. to derive destination information. For example, a user might have a calendar entry indicating a court date on Aug. 23, 2007 at 9:00 AM, and thus it is likely that on Aug. 23, 2007 at 8:30 am, the user is navigating to a courthouse. In additional implementations, the device can pull calendar information from a variety of sources. For example, a user might keep a business calendar and a personal calendar on separate systems. The device can pull information from both systems to derive a destination. In other examples, a husband and wife might each have separate calendars and the device can derive destination information based upon both of the calendars. In examples where the calendar information conflicts, the device can determine which calendar appointment to use, for example, based upon the current user of the device. In further examples, the calendar information can be pulled from the local device itself, a favorite sports team calendar, a shared calendar, etc.

In some implementations, the destination engine 410 can use history information to recognize patterns, and can use preference information to determine which of a plurality of destinations the user intends (e.g., a user might indicate a preference for destination information derived from calendar information over destination information derived from date information). In some implementations, the destination engine 410 can automatically recognize patterns without user input. In other implementations, the destination engine 410 can automatically recognize navigation patterns and allow users to confirm or reject a destination through a user interface.

In some implementations, the routing engine 420 can derive one or more routes based on current location information and destination information. The one or more routes can be derived using existing routing technology, e.g. map overlays. Current location information of the mobile device can be obtained, for example, using a positioning system 318. In various implementations, the positioning system 318 can be provided by a separate device coupled to the mobile device (e.g., mobile device 100 of FIG. 1). In other implementations, the positioning system 318 can be provided internal to the mobile device.

In one implementation, the positioning system 318 can be a global positioning system (GPS) device. In other implementations, the positioning system 318 can be provided by an accelerometer and a compass using dead reckoning techniques. In such implementations, the user can occasionally reset the positioning system by marking the devices presence at a known location (e.g., landmark, intersection, etc.). In still further implementations, the positioning system 318 can be provided by using wireless signal strength and one or more locations of known wireless signal sources to provide current location. Wireless signal sources can include access points and/or cellular towers. Other positioning systems can also be used.

The routing engine 420 can communicate one or more derived routes to an analysis engine 430. The analysis engine 430 can analyze the one or more routes received from the routing engine 420. In some implementations, the one or more routes can be analyzed based on user preferences received from a preference data store 470. Based on the complexity of a route, the route can include many route progressions. Route progressions, in some implementations, can include discrete lengths of roads which, when put together, make up a route.

In some implementations, the route progressions included in a route can be analyzed based upon user preferences retrieved from a preference data store 470. User preference data, for example, might include preferences to avoid certain route progressions or location. In other examples, the preference data can indicate a user preference for types of roads, distance, traffic, traffic control devices (e.g., traffic lights, stop signs, rotaries, etc.), navigation time, preferred routes, neighborhoods, highways, restaurants, etc. In some implementations, the analysis engine can use such preferences to select among the one or more routes provided by the routing engine.

In those implementations that analyze route progressions based on user preferences, route information can be retrieved and used to provide input by which to weight and compare routes based on the preferences. In some implementations, route information can include disfavored route progressions or locations or disfavor preferences (e.g., disfavored types of roads, disfavored neighborhoods, disfavor for taking the same route everyday, disfavored parking places (e.g., street parking, certain parking lots, etc.). In further implementations, route information can also include a probability that a route progression will include a certain type of activity (e.g., accidents, heavy traffic) even if the route progression is not currently exhibiting that type of activity. In those implementations that include disfavored route progressions or locations or preferences, the disfavored route progressions or locations or preferences can be avoided.

Figure 4B:
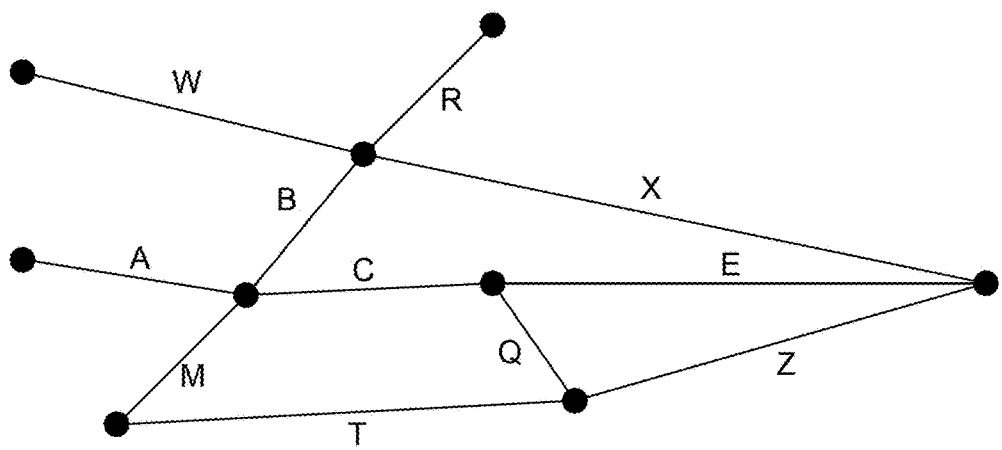
FIG. 4B is a block diagram of a plurality of route progressions.

In some implementations, the routes can be analyzed based upon the traffic information associated with route progressions included in the route. For example, FIG. 4B is a block diagram of a plurality of route progressions. In the example of FIG. 4B, a first route includes progressions A, B and X, a second route includes progressions A, C, Q and Z, and a third route includes progressions A, C and E. However, route progressions M, T, R and W are not included in any of the routes according to a user preference. In those implementations using traffic preferences, the analysis engine 430 can send a request for traffic information associated with only route progressions A, B, C, E, Q, X and Z to the traffic information system 480, while omitting route progressions M, T, R and W because those route progressions are not included in any of the identified routes.

In other implementations using traffic preferences, the traffic information sent to a mobile device (e.g., mobile devices 100 of FIG. 1) can include a universe of traffic information including all available traffic information related to local roads. In such implementations the traffic signal can include many component parts (e.g., one for each available road), and the traffic information for the various roads can be encoded into the signal (e.g., using time division, code division, frequency division, etc.). Thus, the analysis engine 430 can parse (e.g., decode, demultiplex, etc.) the signal to obtain traffic information for a desired route progression. Thus, the mobile device might receive traffic information associated with route progressions A through Z (e.g., A, B, C, E, M, R, T, W, Q, X and Z). Based on the previous example, the analysis engine 430 can parse the traffic information to retrieve traffic related to route progressions A, B, C, E, Q, X and Z.

In some implementations, a user might have indicated a disfavor for route progressions M, Q and X. A routing engine 420, for example, might have determined three routes associated with an origin and destination. A first route might include route progressions A, B and X, a second route might include route progressions A, C, Q and Z, and a third route might include route progressions A, C and E. Based upon the example disfavored routes, the analysis engine 430 can remove the first and second routes from the potential routes, and present only the third route to the user through the presentation engine 440.

In other implementations, the presentation engine can reorder the presentation of all three routes based upon the analysis engine 430 results. Routes including disfavored route progressions can be listed after those routes that do not include disfavored route progressions. In those implementations including a degree of disfavor or weighting associated with the disfavored route progressions or locations or preferences, those routes including the most heavily disfavored route progressions or locations or preferences can be listed after those routes including less disfavored ones. In other implementations, a graphical representation of disfavor can be applied to presented routes. For example, a color spectrum might be applied to the route presentation, whereby green is used to depict most favorable routes, while red is used to depict most disfavored routes.

In some examples, routes might include more than one disfavored route progression or location. In some implementations, the route with the most heavily disfavored route progression or location can be listed after each of the other routes. In other implementations, the analysis engine 430 can derive an aggregation of disfavor associated with the entire route. For example, a first route might include a route progression rated 2 (e.g., on a scale from 1 to 10, "1" being most disfavored and "10" being slightly disfavored), while a second route might include several route progressions rated 3. In such implementations, the analysis engine can place the second route lower in priority because the second route can be inferred to produce more total disfavor based upon the traversal of several disfavored route progressions, while the first route only includes a single disfavored route progression. However, as mentioned above, in some implementations, the second route can be listed ahead of the first route based on the fact that the lowest route progression rating associated with the second route is "3," while the lowest route progression rating associated with the first route is "2."

In further implementations, a distance associated with a route progression can be factored into the determination of whether to give priority to the first route or the second route. For example, if the route progression rated "2" associated with the first route in the above example were the same total distance as an aggregation of the several route progressions rated "3" associated with the second route in the above example, the second route could be given priority over the first route. In such an example, an aggregation of the disfavor associated with the first route would rank the first route lower than an aggregation of the disfavor associated with the second route.

In some implementations, the route information can include historical data. For example, historical data can include information about the average time associated with navigating a route progression. The average time associated with each of the route progressions that are included in a route can combined to provide an estimated total time to navigate the route. The route may then be compared to similarly analyzed routes based on estimated total time to navigate the other routes, which can be used to recommend a route to a user.

In some implementations, the average time to navigate a route progression can be dependent upon the time of day the route progression is being navigated. For example, a section of highway in a large city may be slow at 8:00 am due to rush hour, while the same section of highway might be clear at 10:00 pm. Thus, the historical data can include a time of day for which the average is to be computed. For example, the analysis engine 430 can average the five navigations taken at the closest times of day to a current time. In further implementations, recency of a navigation can be factored in to the estimation of navigation time. For example, the five most recent navigations of a road may be used to calculate an estimated navigation time associated with the route progression. In other implementations, any of these factors can be combined. For example, the time of day can be balanced with the recency of a navigation to produce the five most recent navigations which are closest in time of day to a current time of day.

In further implementations, the route information can include map information received from map system 490. In these implementations, the map information can include distances associated with route progressions, traffic control devices associated with route progressions or portions of route progressions, speed limits associated with route progressions, etc. In some implementations, preferences can be provided which use map information as comparison points between potential routes. For example, if the user indicates a preference for neighborhood driving versus highway driving, the map information can be used to reorder the potential routes based upon such a user preference. The map information can therefore be used to weigh and compare routes based on the preferences.

The analysis engine 430 can provide one or more recommended routes to a presentation engine 440 based on user preferences from the preferences store 470. The presentation engine 440 can communicate with a map system 490 to retrieve map information. In some implementations, the map system 490 can be provided, for example, by a navigation service (e.g., navigation service 230 of FIG. 2). In other implementations, the map system 490 can be provided by a map store residing on the mobile device (e.g., mobile device 100 of FIG. 1). The presentation engine 440 uses map information provided by the map system 490 to overlay the recommended route information based on user preferences. In examples where multiple routes are provided to the user, the presentation engine 440 can receive a route preference from the user and display the preferred route.

In some implementations, the routing engine 420 can continue to analyze a current route to monitor for changing conditions. For example, an accident between the start of navigation of a route and the end of navigation of the route can change the analysis associated with the recommendation of the current route. In such situations, the routing engine 420 and analysis engine 430 can calculate estimated navigation times associated with alternative routes. In some implementations, the routing engine 420 and the analysis engine 430 can automatically communicate a new route to the user through the presentation engine 440. Such automatic rerouting can be provided to the user with notification of the change or without notification of the change to the user. In other implementations, the routing engine 420 and analysis engine 430 can present the estimated navigation times associated with alternative routes to the user through the presentation engine 440. The user can then choose an alternative route based upon the estimated navigation times. The user's choice, in various implementations, can be indicated by selecting a route using an I/O device (e.g., touch screen 346 of FIG. 3), or by navigating one of the alternative routes, among others.

Figure 5:
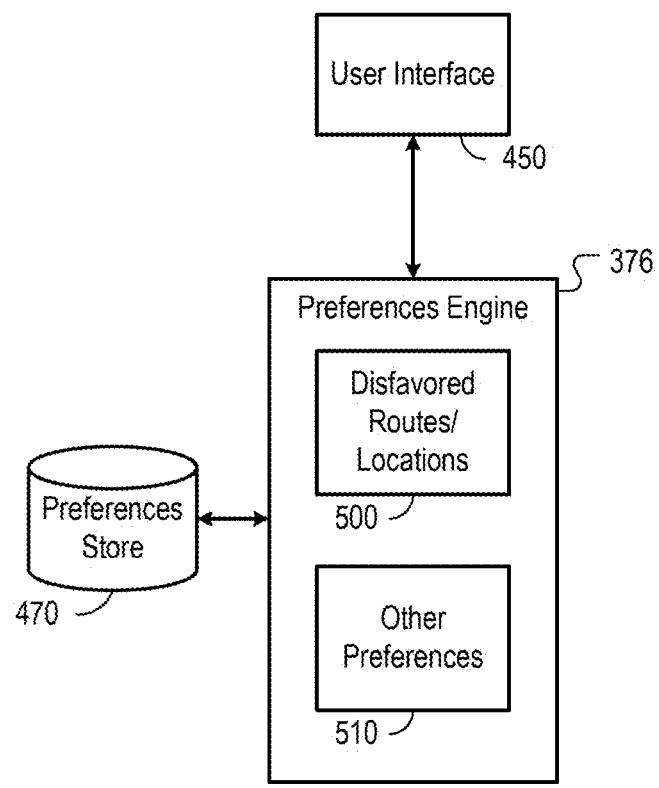
FIG. 5 is a block diagram illustrating an example implementation of a preferences engine.

FIG. 5 is a block diagram illustrating an example implementation of a preferences engine 376. The preferences engine 376 can receive preferences from a user through a user interface 450. The preferences engine 376 can be configured to receive preferences on a variety of different topics. In various implementations, the preferences engine 376 can be configured to receive preferences regarding disfavored routes or locations 500 and other preferences 510.

A disfavored routes or locations preference 500 can include a user's preferences with respect to the user's desire to avoid certain routes or cities. In some implementations, desire to avoid certain routes or locations can be rated on a non-binary scale. In some implementations, the user preference can include a strength associated with the traffic preferences 500. The strength, for example, could be a metric of how strongly a user holds a preference (e.g., on a scale from 1 to 10, how strongly they feel). In some implementations, disfavored routes or locations can include those routes or locations to which the user has negative preferences. For example, a user might be afraid of heights, and therefore wants to avoid route progressions that include high bridges (e.g., the Golden Gate Bridge in San Francisco, Calif.). In other examples, the user might want to avoid urban areas (e.g., large cities).

In some implementations, the user can provide input to the preferences engine 376 specifying those routes or areas that the user wants to avoid. For example, the user can use a user interface to enter locations or streets that the user wants to avoid. In some implementations, the user can provide input to the preferences engine based upon his or her adherence to a presented route. For example, if a user consistently deviates from a presented route at a certain location or route progression, the preferences engine can use this information as input specifying a disfavor with a route progression or location. In other implementations, the preferences engine 376 can analyze historical route information to identify routes or locations avoided by the user. For example, a preferences engine can analyze frequency of use associated with a street or location to determine which streets or locations a user tends to avoid.

In further implementations, a weighting can be applied to a disfavored route progression or location 500 based upon the extent to which a user goes to avoid a route or location. In some implementations, the preferences engine 376 can associate a route progression or location that has never been visited with a neutral rating, inferring that the user might not be familiar with the route progression or location rather than consciously avoiding the route progression or location. In these implementations, the preferences engine 376 can infer that a route progression or location visited only a few times in association with a commonly traveled route is disfavored. Such an inference can be based upon the ratio of the number of times the route has been traveled and not included the route progression. In other implementations, a disfavor preference 500 can be associated with route progressions or locations never visited.

By way of example, if a route from a first location to a second location has been traveled a hundred times, and included a third location only 4 times, an inference can be made that the user disfavors the third location. However, if for example, the route from the first location to the second location had only been traveled ten times, and included the third location four times, the third location is likely not disfavored. In some implementations a weighting associated with the disfavor of a route progression or location 500 can be set based upon the ratio between usage of a routes progressions/locations during a route and the total number of times the route has been traversed (e.g., excluding route progressions/locations that have never been used/visited).

In still further implementations, routing instructions (e.g., routing instructions 374 of FIG. 4A) can identify when a user avoids a route progression presented by the routing instructions and notify the preferences engine 376. In such implementations, the preferences engine 376 can infer from the user's rejection of the route progression that the user does not favor the route progression or location included within the route provided by the routing instructions. In those implementations including a weighting associated with a disfavored route progression or location 500, the preference engine 376 can infer that the avoidance of a route progression or location during presentation of a route is an indication that the route progression or location should be more heavily disfavored in comparison to other derivations of disfavored route progressions or locations 500.

Other preferences 510 can include many different types of preferences including: traffic preferences, road preferences, scenery preferences, traffic control device preferences, services preferences, city preferences, or speed preferences, new route preferences, among many others.

In those implementations including a strength associated with a user preference, the analysis engine (e.g., analysis engine 430 of FIG. 4A) can use the strength to weight the route progressions and use the weighted route progressions to compare routes. For example, the user's desire to avoid traffic can be rated on a scale from 1 to 10, with a rating of "1" corresponding to a highly disfavored route progression or location, and a rating of "10" corresponding to a slightly disfavored route progression or location. In examples where the user indicates a strong disfavor for a route progression or location, the analysis engine can weight the route progressions with higher disfavor more negatively than those with slight disfavor, thereby making it more likely that an analysis engine (e.g., analysis engine 430) will recommend routes having slight disfavor or no disfavor at all. However, in the implementations that include multiple preferences associated with the user, the strengths of other preferences could outweigh other preferences depending on a strength associated with the other preferences.

In some implementations, a group of users can rate a route progression in several categories. The route progression can be assigned a score based on the user ratings. In other implementations, route progressions can be assigned scores based on the individual route progression's popularity among users that have indicated a strong preference for a certain kind of route progression. For example, if a user or group of users indicate a strong preference for scenic roads, and each uses a certain road more frequently in comparison to other roads, the system can assign a high scenery score to the road. In still further implementations, the route progressions can be rated automatically based on measurable statistics. For example, traffic information can identify which route progression is the worst for traffic based upon the average speed associated with the road, or based upon a delta between average speed and speed limit. Similarly, the best route progression for traffic can be identified based on the average speed associated with the road, or based upon a delta between average speed and the speed limit. The worst route progression can be assigned the lowest possible score, and the best route progression can be assigned the highest possible score, while other route progressions are assigned scores which are scaled based upon the high and low scales. Such automatic scoring can be performed where there is an objective measure by which to compare route progressions.

Figure 6:
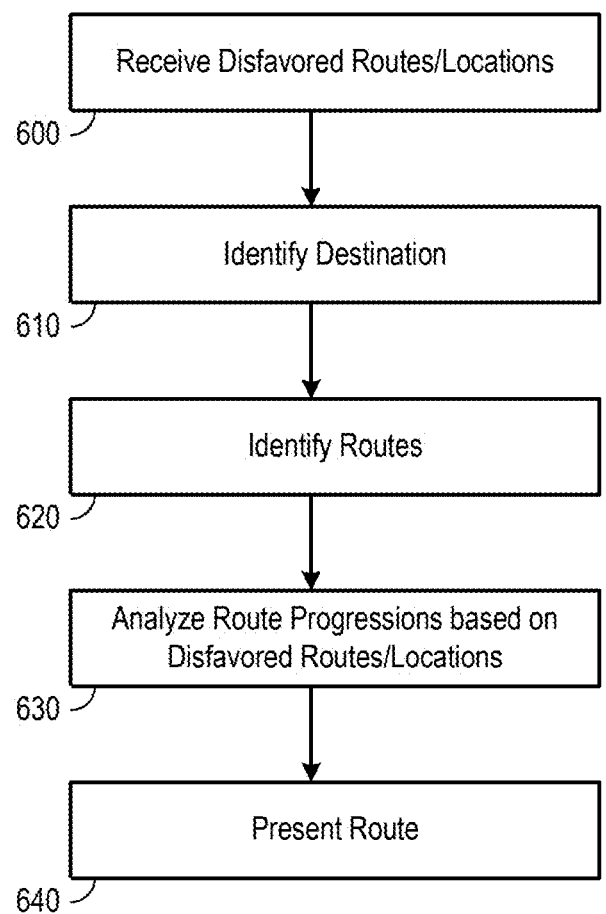
FIG. 6 is a flowchart illustrating an example method for routing.

FIG. 6 is a flowchart illustrating an example method for route guidance. At stage 600 disfavored route progressions or locations or preferences are received. Disfavored route progressions or locations can be received, for example, by a preferences engine (e.g., preferences engine 376 of FIG. 5) in conjunction with a user interface (e.g., user interface 450 of FIG. 5). The disfavored route progressions or locations can include, for example, any route progressions or locations indicated by the user (e.g., through a user interface, frequency of use, avoidance of presented routes, etc.).

At stage 610 the destination is identified. The destination can be identified, for example, by a destination engine (e.g., destination engine 410 of FIG. 4). In some implementations, the destination engine can identify destination information from user input received using a user interface (e.g., user interface 450 of FIG. 4). In such implementations, the user can provide destination information to a mobile device (e.g., mobile device 100 of FIG. 1). In other implementations, the destination engine can identify destination information based on historical data retrieved from a history data store (e.g., history data store 460 of FIG. 4). For example, the destination engine can mine the historical data to automatically derive navigation patterns based on such variables as day, time of day, holiday, and user calendar, among many others. In still further examples, the destination engine can identify destination information based on a combination of user input and historical information. For example, the destination engine can use the user interface to prompt the user to select a destination from among a group of destinations derived based on the historical data.

At stage 620, routes associated with the destination are identified. The routes can be identified, for example, using a routing engine (e.g., routing engine 420). In some implementations, the routing engine can receive position information from a positioning system (e.g., positioning system 318 of FIG. 4). The positioning information can be used as a starting point for the routing engine. In some implementations, the routing engine can use a navigation service (e.g., navigation service 230 of FIG. 2) to derive one or more routes. In other implementations, the routing engine can use GPS/navigation instructions 368 to derive one or more routes.

At stage 630, the route is analyzed based on disfavored route progressions or locations or preferences. The route can be analyzed, for example, using an analysis engine (e.g., analysis engine 430 of FIG. 4). The analysis can retrieve disfavored route progressions or locations from a preferences store (e.g., preferences store 470 of FIG. 4) and use the preferences to weight the route progressions included in the identified routes. The weighted route progressions can be used to rearrange the identified routes based on the user preferences. In some implementations, the analysis can retrieve route information from several different sources (e.g., history data store 460, traffic information system 480, map system 490, of FIG. 4) to use in conjunction with the preference information.

At stage 640, a route is presented. The route can be presented, for example, by a presentation engine (e.g., presentation engine 440) to a user of a mobile device. The presented route can be overlaid onto a map provided by a navigation system (e.g., map system 490 of FIG. 4, or navigation services 230 of FIG. 2). In other implementations, the route can be overlaid on a map provided by a local map data store. In some implementations, the map includes a number of road representations. In further implementations, the road representations, for example, can be overlaid by route information associated with respective route progressions. The presentation of the route can enable a user of the mobile device to navigate from a current position to a destination.

Figure 7:
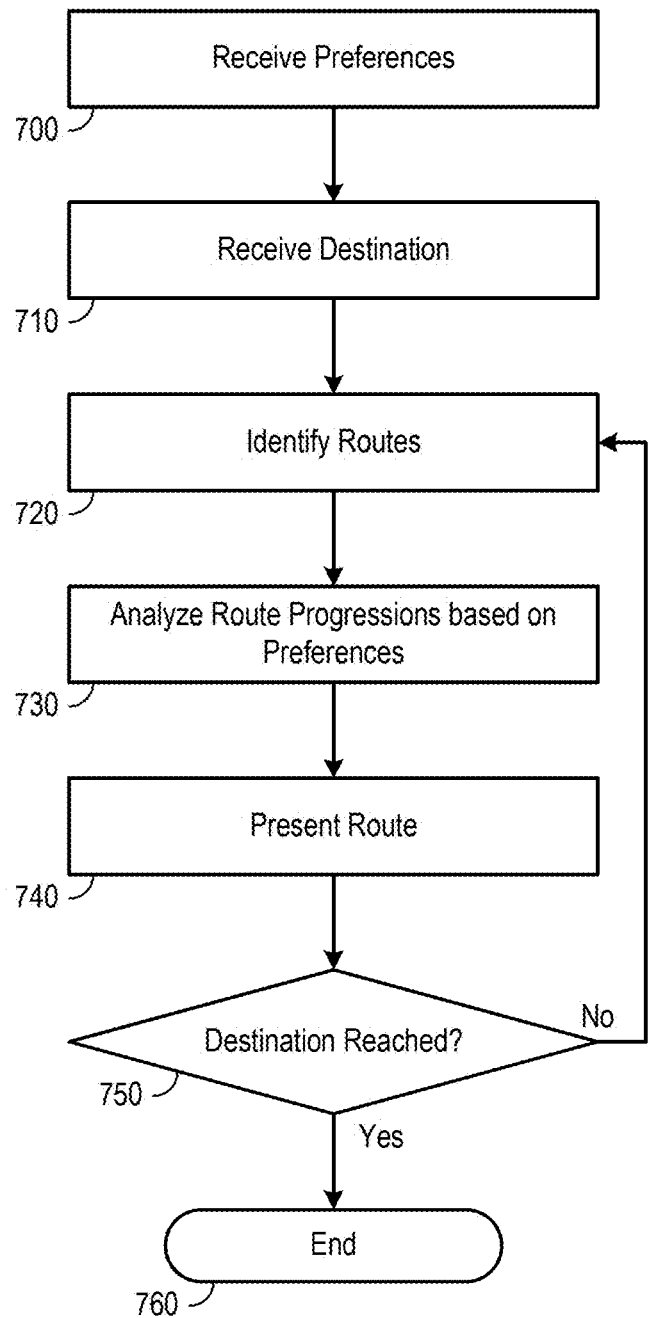
FIG. 7 is a flowchart illustrating another example method for routing.

FIG. 7 is a flowchart illustrating another example method for route guidance. At stage 700 user preferences are received. Preferences can be received, for example, by a preferences engine (e.g., preferences engine 376 of FIG. 5) in conjunction with a user interface (e.g., user interface 450 of FIG. 5). The preferences can include, for example, disfavored route progressions or locations as well as other preferences. In various implementations, other preferences can include traffic preferences, road preferences, scenery preferences, traffic control device preference, services preferences, city preferences, speed preferences, or other preferences. Disfavored route progressions can include, for example, streets that the user does not want to take for some reason (e.g., a road that is in disrepair, etc.). Disfavored locations can include, for example, areas that the user wants to avoid (e.g., industrial areas, areas with high traffic, etc.). In some implementations, disfavored route progressions and/or locations can be disfavored dependent on a time of day. For example, a user might dislike driving on a particular road or through a particular area at night, while not disfavoring the road or area during the daytime. In further implementations, there can be multiple sets of preferences, each set of preferences being associated with a particular user of the device. In such implementations, the device can provide route guidance based upon the particular user who is logged into the system.

In some implementations, the preferences can be received directly from a user. For example, a user can use a user interface to enter his or her disfavored roads and/or areas. In other implementations, the preferences can be derived based upon the user's actions during previous route guidance. For example, if a user consistently refuses to follow a presented route, the device can determine that the user disfavors the route progression and/or location where he/she deviated from the route. In some implementations, the disfavor can be time-based. For example, a user might heavily disfavor a route progression in the morning, but favor the route progression at night. In other implementations, the preferences can be derived based upon historical data. For example, if a user travels from home to work every day for a year, and has used a particular road on that trip only once, a preference engine can derive that the user disfavors that road or area associated with the road. In some implementations, a combination of user input, deviation from route guidance and/or derivation from historical data can be used to determine preferences.

At stage 710 the destination is received/identified. The destination can be received, for example, by a destination engine (e.g., destination engine 410 of FIG. 4). In various implementations, the destination engine can operate based on user input received using a user interface (e.g., user interface 450 of FIG. 4), or can automatically derive a destination based on historical data, and combinations thereof.

At stage 720, routes associated with the destination are identified. The routes can be identified, for example, using a routing engine (e.g., routing engine 420). In some implementations, the routing engine can receive position information from a positioning system (e.g., positioning system 318 of FIG. 4). The positioning information can be used as a starting point for the routing engine, and the routing engine can use a navigation service (e.g., navigation service 230 of FIG. 2) to derive one or more routes. In other implementations, the routing engine can use GPS/navigation instructions 368 to derive one or more routes.

At stage 730, the route is analyzed based on user preferences. The route can be analyzed, for example, using an analysis engine (e.g., analysis engine 430 of FIG. 4) in conjunction with preference information retrieved from a preference store (e.g., preferences store 470 of FIG. 4). In some implementations, the analysis can receive several different routes and prioritize the routes based on the received user preferences, including, for example, disfavored route progressions and/or locations. In some implementations, the analysis engine can reorder the presentation of a plurality of identified routes based on analysis of the route progressions with respect to the user preferences.

At stage 740, a route is presented. The route can be presented, for example, by a presentation engine (e.g., presentation engine 440) to a user of a mobile device. The route can be presented in any of the ways discussed with reference to FIG. 6.

At stage 750, a determination can be made whether a destination has been reached. The determination can be made, for example, by an analysis engine (e.g., analysis engine 430 of FIG. 4) in conjunction with a positioning system (e.g., positioning system 318 of FIG. 4). Where the destination has been reached, the process ends at stage 760.

If the destination has not been reached, the method can return to stage 720, where alternative routes including a plurality of route progressions are retrieved. The route progressions associated with the alternative routes can then be analyzed, and one or more alternative routes are presented to a user based on the analysis (e.g., an accident, traffic build-up, traffic clearing up, time of day dependencies elapsing, etc.). Thus, a mobile device (e.g., mobile device 100 of FIG. 1) can reroute the user based on changing road conditions. In some implementations, an alternative route is automatically presented to the user without notification, and replaces the current route. In other implementations, a user can be notified that another route might be preferable, and the estimated navigation times associated with both routes can be compared and the user can decide whether to continue on a current route, or to take an alternative route.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

The invention claimed is:

1. A method performed by a mobile device, the method comprising:
    identifying a destination that a user intends to travel to;
    computing one or more routes for traveling to the destination, wherein each of the one or more routes includes route progressions, a route progression indicating a discrete length of a road that is part of a route;
    for each of the one or more routes, analyzing the included route progressions based on preferences for travel associated with the user, wherein the preferences include disfavored route progressions or disfavored locations, a disfavored route progression indicating a route progression to be avoided while driving to the destination, and a disfavored location indicating a geographical area that is to be avoided while driving to the destination; and
    selecting a route from the one or more routes based on an aggregate number of disfavored route progressions or disfavored locations included in each route.

2. The method of claim 1, wherein the disfavored route progressions or disfavored locations are based on one or more of traffic preferences, road preferences, scenery preferences, traffic control device preference, services preferences, city preferences and speed preferences.

3. The method of claim 2, comprising:
    examining historical data associated with the user's actions during previous route guidance;
    based on the examining, determining one or more of a route progression and location avoided by the user previously; and
    identifying the determined route progression or the location as a disfavored route progression or disfavored location respectively.

4. The method of claim 3, wherein a disfavored route progression or disfavored location is based on a diurnal time, the method comprising:
    determining a route progression or a location avoided by the user at a first time of a day, but favored by the user at a second time of the day; and
    identifying the determined route progression or the location as a disfavored route progression or disfavored location respectively, wherein the identifying as a disfavored route progression or disfavored location is limited to the first time of the day.

5. The method of claim 3, wherein a disfavored route progression or disfavored location is based on a frequency of traversal, the method comprising:
    determining a route progression or a location traversed by the user less than a predetermined number for traveling to a particular destination; and
    identifying the determined route progression or the location as a disfavored route progression or disfavored location respectively for traveling to the particular destination.

6. The method of claim 2, comprising:
    computing a probability that a particular route progression will include in future a certain type of activity that the particular route progression is not currently exhibiting; and determining the particular route progression to be a disfavored route progression based on computing the probability.

7. The method of claim 1, wherein determining the preferences associated with the user comprises at least one of:
receiving the preferences directly from the user, the preferences entered through a user interface that is coupled to the mobile device,
automatically deriving the preferences based upon actions of the user during a previous route guidance, and
automatically deriving the preferences using historical route data associated with the user.

8. The method of claim 1, wherein identifying the destination comprises automatically deriving destination information using historical data associated with the user, the method further comprising:
examining the historical data associated with the user to derive navigation habits associated with the user; and
automatically determining destination information based on the navigation habits and utilizing one or more of date information, time information, calendar information, history information and preference information associated with the user.

9. The method of claim 8, wherein automatically determining destination information utilizing calendar information comprises:
retrieving one or more calendars associated with a first user and a second user, wherein both the first user and the second user are associated with operation of the mobile device for navigation;
identifying one or more calendar entries included in the retrieved calendars that are within a predetermined range of a present date and time;
determining one or more prospective destinations from the identified calendar entries; and
selecting one of the prospective destinations as the destination for navigation, wherein the selected destination is associated with one of the first user or the second user who is currently operating the mobile device.

10. The method of claim 8, wherein automatically determining destination information utilizing date information comprises:
determining at least one of current day of the week or current time of the day;
identifying, based on examining the historical data, a destination associated with at least one of the determined current day of the week or determined current time on the day; and
selecting the identified destination.

11. The method of claim 8, wherein automatically determining destination information utilizing date information comprises:
determining that current date is a specific holiday;
identifying, based on examining the historical data, a destination previously visited by the user on the determined specific holiday; and
selecting the identified destination.

12. The method of claim 1, further comprising:
determining whether the destination has been reached;
based on determining that the destination has not been reached, retrieving alternative routes for traveling to the destination;
analyzing the route progressions included in the alternative routes based on route preferences associated with the user and metrics associated with the respective route preferences; and
presenting the one or more alternative routes to the user for rerouting to the destination.

13. The method of claim 1, wherein selecting a route from the one or more routes comprises:
assigning weights to the disfavored route progressions or disfavored locations based on user route preferences;
for each route, computing a score based on a combined weight for the aggregate number of disfavored route progressions or disfavored locations included in the route;
ordering the one or more routes based on the computed scores; and
selecting the route from the ordering of the one or more routes.

14. The method of claim 13, wherein assigning weights to the disfavored route progressions or disfavored locations comprises:
determining that a first route preference is more strongly disfavored by the user compared to a second route preference; and
based on the determination, providing greater weight to a disfavored route progression or disfavored location associated with the first route preference compared to disfavored route progression or disfavored location associated with the second route preference.

15. The method of claim 1, wherein selecting a route from the one or more routes comprises:
displaying graphical representations of the one or more routes to the user, wherein the graphical representations are color-coded based on route preferences associated with the user and metrics associated with the route preferences.

16. A method performed by a mobile device, the method comprising:
determining preferences associated with a user of a mobile device for traveling;
identifying a destination that the user intends to travel to;
computing potential routes for traveling to the destination, each of the potential routes comprising route progressions, wherein a route progression includes a discrete length of a road that is part of a route for driving to a destination;
for each of the potential routes, analyzing the route progressions associated with the potential route based on the preferences associated with the user and ratings for one or more of the route progressions, wherein a rating for a route progression is based on the route progression being used by a plurality of users more frequently than other similar route progressions; and
based on the analyzing, presenting one or more of the potential routes as recommended routes to the user for traveling to the destination.

17. A device comprising:
a processor; and
instructions stored in a machine-readable medium for execution by the processor and configured to cause the processor to perform operations comprising:
identifying a destination that a user intends to travel to;
computing one or more routes for traveling to the destination, wherein each of the one or more routes includes route progressions, a route progression indicating a discrete length of a road that is part of a route;
for each of the one or more routes, analyzing the included route progressions based on preferences for travel associated with the user, wherein the preferences include disfavored route progressions or disfavored locations, a disfavored route progression indicating a route progression to be avoided while driving to the destination, and a disfavored location indicating a geographical area that is to be avoided while driving to the destination; and selecting a route from the one or more routes based on an aggregate number of disfavored route progressions or disfavored locations included in each route.

18. The device of claim 17, wherein the disfavored route progressions or disfavored locations are based on one or more of traffic preferences, road preferences, scenery preferences, traffic control device preference, services preferences, city preferences and speed preferences.

19. The device of claim 18, wherein the instructions are configured to cause the processor to perform operations further comprising:

computing a probability that a particular route progression will include in future a certain type of activity that the particular route progression is not currently exhibiting; and determining the particular route progression to be a disfavored route progression based on computing the probability.

20. The device of claim 18, wherein the instructions are configured to cause the processor to perform operations comprising:

examining historical data associated with the user's actions during previous route guidance;

based on the examining, determining one or more of a route progression and location avoided by the user previously; and identifying the determined route progression or the location as a disfavored route progression or disfavored location respectively.

21. The device of claim 20, wherein a disfavored route progression or disfavored location is based on a diurnal time, and wherein the instructions are configured to cause the processor to perform operations comprising:

determining a route progression or a location avoided by the user at a first time of a day, but favored by the user at a second time of the day; and identifying the determined route progression or the location as a disfavored route progression or disfavored location respectively, wherein the identifying as a disfavored route progression or disfavored location is limited to the first time of the day.

22. The device of claim 20, wherein a disfavored route progression or disfavored location is based on a frequency of traversal, and wherein the instructions are configured to cause the processor to perform operations comprising:

determining a route progression or a location traversed by the user less than a predetermined number for traveling to a particular destination; and identifying the determined route progression or the location as a disfavored route progression or disfavored location respectively for traveling to the particular destination.

23. The device of claim 17, wherein the instructions that are configured to cause the processor to perform operations comprising determining the preferences associated with the user include instructions that are configured to cause the processor to perform operations comprising at least one of:

receiving the preferences directly from the user, the preferences entered through a user interface that is coupled to the device, automatically deriving the preferences based upon actions of the user during a previous route guidance, and automatically deriving the preferences using historical route data associated with the user.

24. The device of claim 17, wherein identifying the destination comprises automatically deriving destination information using historical data associated with the user, and wherein the instructions are configured to cause the processor to perform operations further comprising:

examining the historical data associated with the user to derive navigation habits associated with the user; and automatically determining destination information based on the navigation habits and utilizing one or more of date information, time information, calendar information, history information and preference information associated with the user.

25. The device of claim 24, wherein the instructions that are configured to cause the processor to perform operations comprising automatically determining destination information utilizing calendar information include instructions that are configured to cause the processor to perform operations comprising:

retrieving one or more calendars associated with a first user and a second user, wherein both the first user and the second user are associated with operation of the device for navigation;

identifying one or more calendar entries included in the retrieved calendars that are within a predetermined range of a present date and time;

determining one or more prospective destinations from the identified calendar entries; and selecting one of the prospective destinations as the destination for navigation, wherein the selected destination is associated with one of the first user or the second user who is currently operating the device.

26. The device of claim 24, wherein the instructions that are configured to cause the processor to perform operations comprising automatically determining destination information utilizing calendar information include instructions that are configured to cause the processor to perform operations comprising:

determining at least one of current day of the week or current time of the day;

identifying, based on examining the historical data, a destination associated with at least one of the determined current day of the week or determined current time on the day; and selecting the identified destination.

27. The device of claim 24, wherein the instructions that are configured to cause the processor to perform operations comprising automatically determining destination information utilizing calendar information include instructions that are configured to cause the processor to perform operations comprising:

determining that current date is a specific holiday;

identifying, based on examining the historical data, a destination previously visited by the user on the determined specific holiday; and selecting the identified destination.

28. The device of claim 17, wherein the instructions are configured to cause the processor to perform operations further comprising:

determining whether the destination has been reached;

based on determining that the destination has not been reached, retrieving alternative routes for traveling to the destination;

analyzing the route progressions included in the alternative routes based on route preferences associated with the user and metrics associated with the respective route preferences; and presenting the one or more alternative routes to the user for rerouting to the destination.

29. The device of claim 17, wherein selecting a route from the one or more routes comprises:

assigning weights to the of disfavored route progressions or disfavored locations based on user route preferences;

for each route, computing a score based on a combined weight for the aggregate number of disfavored route progressions or disfavored locations included in the route;

ordering the one or more routes based on the computed scores; and selecting the route from the ordering of the one or more routes.

30. The device of claim 17, wherein selecting a route from the one or more routes comprises:

displaying graphical representations of the one or more routes to the user, wherein the graphical representations are color-coded based on route preferences associated with the user and metrics associated with the route preferences.

* * * * *